United States Patent
Chhaya et al.

(10) Patent No.: US 12,147,775 B2
(45) Date of Patent: **\*Nov. 19, 2024**

(54) CONTENT AUGMENTATION WITH MACHINE GENERATED CONTENT TO MEET CONTENT GAPS DURING INTERACTION WITH TARGET ENTITIES

(71) Applicant: Adobe Inc., San Jose, CA (US)

(72) Inventors: Niyati Himanshu Chhaya, Telangana (IN); Udit Kalani, Uttarakhand (IN); Roodram Paneri, Rajasthan (IN); Sreekanth Reddy, Andhra Pradesh (IN); Niranjan Kumbi, Fremont, CA (US); Navita Goyal, Bangalore (IN); Balaji Vasan Srinivasan, Bangalore (IN); Ayush Agarwal, Rajasthan (IN)

(73) Assignee: Adobe Inc., San Jose, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 17/501,602

(22) Filed: Oct. 14, 2021

(65) Prior Publication Data
US 2023/0121711 A1     Apr. 20, 2023

(51) Int. Cl.
*G06F 40/40*     (2020.01)
*G06F 40/216*    (2020.01)
(Continued)

(52) U.S. Cl.
CPC ............ *G06F 40/40* (2020.01); *G06F 40/216* (2020.01); *G06F 40/279* (2020.01); *G06F 40/30* (2020.01);
(Continued)

(58) Field of Classification Search
CPC ...... G06F 40/40; G06F 40/216; G06F 40/279; G06F 40/30; G06F 40/44; G06F 40/56; G06N 3/08; G06N 3/09
(Continued)

(56) References Cited

U.S. PATENT DOCUMENTS 10,936,962 B1 *   3/2021   Neumann ............... G06N 5/046
11,423,234 B2 *   8/2022   De Ridder ............ G06F 40/143
(Continued)

FOREIGN PATENT DOCUMENTS

WO   WO-2020163109 A1 *   8/2020   ............. H04L 51/02

OTHER PUBLICATIONS

Blei et al., Latent Dirichlet Allocation, Journal of Machine Learning Research, vol. 3, Jan. 2003, pp. 993-1022.
(Continued)

*Primary Examiner* — Edwin S Leland, III
(74) *Attorney, Agent, or Firm* — Kilpatrick Townsend & Stockton LLP

(57) ABSTRACT

A content generator system receives a request to generate content for a target entity, and one or more keywords. The content generator system retrieves, for the target entity, a current stage identifier linking the target entity to a current stage within a multi-stage objective. The content generator system generates an input vector including the current stage identifier, a target stage identifier, a token embedding comprising the one or more keywords, and a position embedding for each of the one or more keywords, the target stage identifier associated with a target stage within the multi-stage objective different from the current stage. The content generator system generates output text content for the target entity by applying a generative transformer network to the input vector. The content generator system transmits the output text content to a computing device associated with the target entity.

17 Claims, 8 Drawing Sheets

(51) Int. Cl.
  *G06F 40/279* (2020.01)
  *G06F 40/30* (2020.01)
  *G06F 40/44* (2020.01)
  *G06F 40/56* (2020.01)
  *G06N 3/08* (2023.01)
  *G06N 3/09* (2023.01)

(52) U.S. Cl.
  CPC .............. *G06F 40/44* (2020.01); *G06F 40/56* (2020.01); *G06N 3/08* (2013.01); *G06N 3/09* (2023.01)

(58) Field of Classification Search
  USPC .............................................................. 704/9
  See application file for complete search history.

(56) References Cited

U.S. PATENT DOCUMENTS

| | | | | |
|---|---|---|---|---|
| 11,501,754 | B2* | 11/2022 | Knight | G06F 40/35 |
| 2017/0091171 | A1* | 3/2017 | Perez | G06F 40/35 |
| 2018/0025085 | A1* | 1/2018 | Sarangi | H04L 67/02 |
| | | | | 707/722 |
| 2018/0137854 | A1* | 5/2018 | Perez | G06F 40/35 |
| 2020/0159997 | A1* | 5/2020 | Wu | G06N 3/047 |
| 2020/0259891 | A1* | 8/2020 | Abraham | H04L 67/1008 |
| 2021/0133627 | A1* | 5/2021 | Neumann | G06N 3/042 |
| 2021/0183515 | A1* | 6/2021 | Neumann | G16H 50/70 |
| 2021/0271823 | A1* | 9/2021 | De Ridder | G06N 5/022 |
| 2022/0013108 | A1* | 1/2022 | Knight | G06F 40/35 |
| 2022/0028371 | A1* | 1/2022 | Xu | G10L 15/063 |
| 2022/0107979 | A1* | 4/2022 | Coope | G10L 15/22 |
| 2022/0292139 | A1* | 9/2022 | Mass | G06F 16/3329 |
| 2022/0319669 | A1* | 10/2022 | Greenbaum | G16H 20/70 |
| 2022/0414128 | A1* | 12/2022 | Raimondo | G06F 16/3344 |
| 2023/0121711 | A1* | 4/2023 | Chhaya | G06F 40/279 |
| | | | | 704/9 |
| 2023/0418856 | A1* | 12/2023 | Cai | G06F 40/30 |

OTHER PUBLICATIONS

Devlin et al., BERT: Pre-Training of Deep Bidirectional Transformers for Language Understanding, In Proceedings of the Conference of the North American Chapter of the Association for Computational Linguistics: Human Language Technologies, vol. 1, May 24, 2019, 16 pages.
Goyal et al., CaM-Gen: Causally-Aware Metric-guided Text Generation, Available online at: https://arxiv.org/pdf/2010.12795.pdf, Oct. 24, 2020, 9 pages.
Hu et al., Toward Controlled Generation of Text, Proceedings of the 34th International Conference on Machine Learning, vol. 70, 2017, 10 pages.
Joulin et al., Fasttext.Zip: Compressing Text Classification Models, Under Review as a Conference Paper at ICLR 2017, Available Online at https://arxiv.org/pdf/1612.03651.pdf, Dec. 12, 2016, pp. 1-13.
Keskar et al., Ctrl: A Conditional Transformer Language Model for Controllable Generation, Available online at: https://arxiv.org/pdf/1909.05858.pdf, Sep. 20, 2019, 18 pages.
Kingma et al., ADAM: A Method for Stochastic Optimization, In International Conference on Learning Representations, 2015, pp. 1-15.
Lin, Rouge: A Package for Automatic Evaluation of Summaries, Text Summarization Branches Out, Association for Computational Linguistics, Jul. 25, 2004, 8 pages.
Pagnoni et al., Conditional Variational Autoencoder for Neural Machine Translation, Available online at: https://arxiv.org/pdf/1812.04405.pdf, Dec. 11, 2018, 9 pages.
Park et al., Semantic Image Synthesis with Spatially-Adaptive Normalization, 2019 IEEE/CVF Conference on Computer Vision and Pattern Recognition (CVPR), 2019, pp. 2337-2346.
Paul, Feature Selection as Causal Inference: Experiments with Text Classification, In Proceedings of the 21st Conference on Computational Natural Language Learning, Aug. 3-4, 2017, pp. 163-172.
Radford et al., Language Models are Unsupervised Multitask Learners, Available Online at: https://d4mucfpksywv.cloudfront.net/better-language-models/language_models_are_unsupervised_multitask_learners.pdf, 2019, 24 pages.
Sellam et al., BLEURT: Learning Robust Metrics for Text Generation, In Proceedings of the 58th Annual Meeting of the Association for Computational Linguistics, Jul. 5-10, 2020, pp. 7881-7892.
Sennrich et al., Neural Machine Translation of Rare Words with Subword Units, Proceedings of the 54th Annual Meeting of the Association for Computational Linguistics (vol. 1: Long Papers), Aug. 7-12, 2016, pp. 1715-1725.
Sohn et al., Learning Structured Output Representation using Deep Conditional Generative Models, Advances in Neural Information Processing Systems, vol. 28, Dec. 2015, pp. 1-9.
Tan et al., User Response Driven Content Understanding with Casual Inference, Yahoo Research, 2019 IEEE International Conference on Data Mining (ICDM), 2019, pp. 1324-1329.
Veitch et al., Adapting Text Embeddings for Causal Inference, Proceedings of the 36' Conference on Uncertainty in Artificial Intelligence (UAI), PMLR, vol. 124, Jul. 25, 2020, 10 pages.
Verma et al., Modeling Causal Impact of Textual Style on a Targeted Goal, WWW '20: Companion Proceedings of the Web Conference 2020, Apr. 20-24, 2020, pp. 59-60.
Wang et al., Topic-Guided Variational Autoencoders for Text Generation, In Proceedings of the 2019 Conference of the North American Chapter of the Association for Computational Linguistics: Human Language Technologies, vol. 1, 2019, 12 pages.
Yan et al., Attribute2Image: Conditional Image Generation from Visual Attributes, Available online at: https://eng.ucmerced.edu/people/jyang44/papers/eccv16_attr2img.pdf, 2015, 16 pages.
Zeng et al., Style Example-Guided Text Generation using Generative Adversarial Transformers, Available online at: https://arxiv.org/pdf/2003.00674.pdf, Mar. 2, 2020, 20 pages.
Zhang et al., Variational Neural Machine Translation, Proceedings of the 2016 Conference on Empirical Methods in Natural Language Processing, Nov. 1-5, 2016, pp. 521-530.
Zhao et al., Learning Discourse-Level Diversity for Neural Dialog Models using Conditional Variational Autoencoders, Proceedings of the 55th Annual Meeting of the Association for Computational Linguistics, vol. 1, Jul. 30-Aug. 4, 2017, pp. 654-664.
Wolf et al., Transformer: State-of-the-Art Natura Language Processing, Available online at https://github.com/huggingface/transformers, Proceedings of the 2020 Conference on Empirical Methods in Natural Language Processing: System Demonstrations, Nov. 2020, pp. 38-45.

* cited by examiner

CONTENT AUGMENTATION WITH MACHINE GENERATED CONTENT TO MEET CONTENT GAPS DURING INTERACTION WITH TARGET ENTITIES

TECHNICAL FIELD

This disclosure generally relates to machine learning techniques for generating content. More specifically, but not by way of limitation, this disclosure relates to using or training language models for causally guided generation of content.

BACKGROUND

Content creators (e.g. authors, marketers, and other content creators) often create content to achieve an objective that is in the interest of either the content creator or a target (e.g. a reader/viewer). The objective could be an increase in a level of interest in an item, a conversion, a mastery of or increase in familiarity in a subject area, or other goal. In some instances, the objective is a lifecycle or other multi-stage objective. The content creator often desires to generate content that progresses, or otherwise contributes to a progression of, the target from a current stage to a successive stage along the multi-stage objective.

In some instances, content creators use automatic content generation models, including language generation models and other content generation models, to generate and/or augment content. However, conventional automated content generation models do not generate content that is effective in causing a target reader/viewer to progress to a subsequent stage in a multi-stage objective.

SUMMARY

The present disclosure describes techniques for using generative pre-trained transformer networks to automatically generate content that is effective in moving a target entity toward a successive target stage of a multi-stage objective, wherein the generated content can be used for modifying online computing environments or other systems. For example, a content generator system receives a request to generate content for a target entity, wherein the request includes one or more keywords. The content generator system retrieves, for the target entity, a current stage identifier linking the target entity to a current stage within a multi-stage objective. The content generator system generates an input vector including the current stage identifier, a target stage identifier, a token embedding comprising the one or more keywords, and a position embedding for each of the one or more keywords, the target stage identifier associated with a target stage within the multi-stage objective different from the current stage. The content generator system generates output text content for the target entity by applying a generative transformer network to the input vector. In certain examples, the generative transformer network is trained to determine output text predicted to cause a transition of the target entity from the current stage to the target stage; and transmitting the output text content to a computing device associated with the target entity. The content generator system transmits the output text content to a computing device associated with the target entity.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
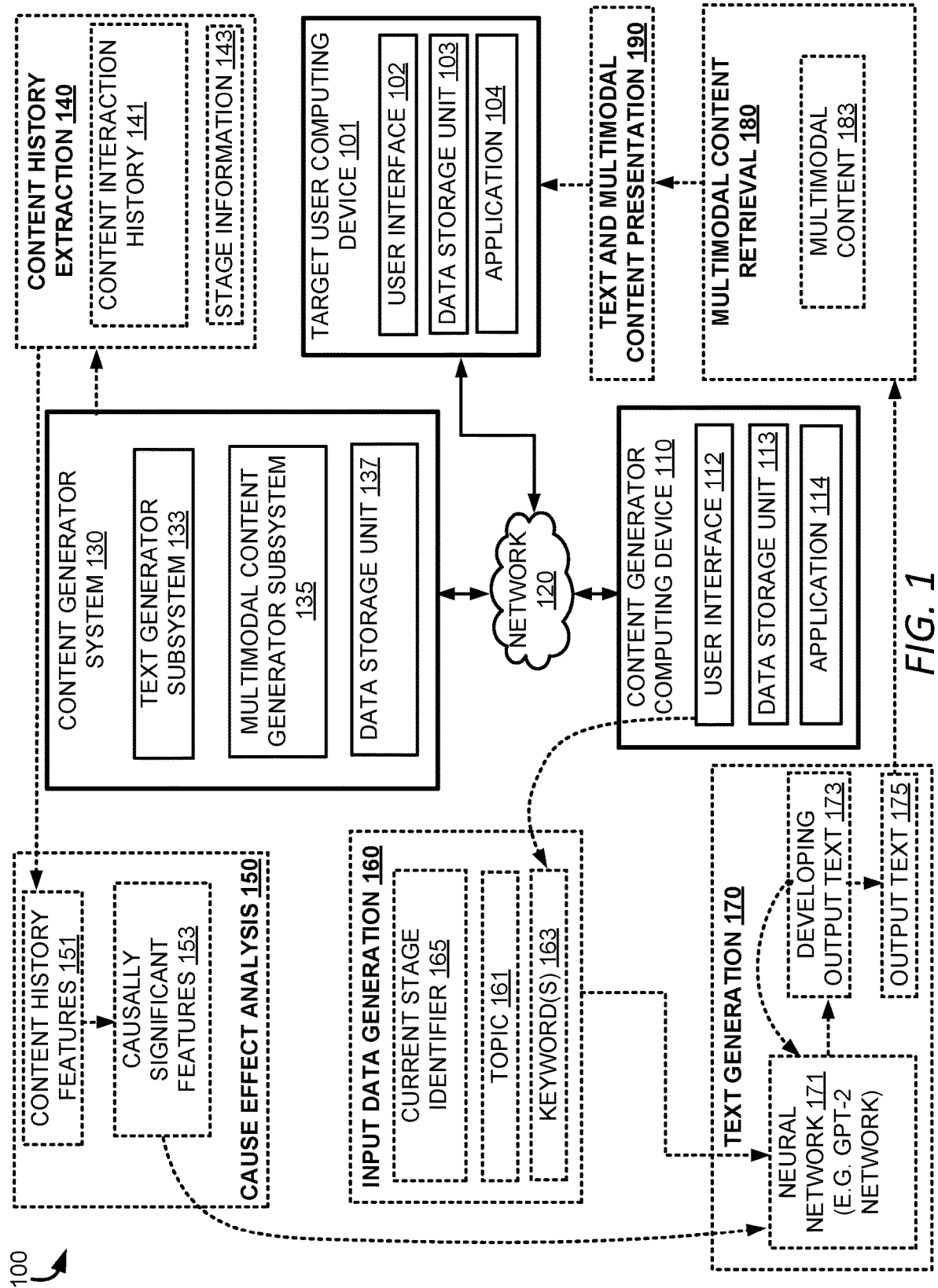
FIG. 1 depicts an example of a computing environment for using generative pre-trained transformer networks to generate content predicted to transition a target entity from a current stage to a target stage of a multi-stage objective, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a machine learning model (e.g., a generative pre-trained transformer model) to automatically generate content that is effective in moving a target entity toward a successive target stage of a multi-stage objective, wherein the generated content can be used for modifying online computing environments or other systems. Certain embodiments described herein improve the performance of automated content generation systems by, for example, implementing a cause-effect analysis to predict content features that have a significant impact on a target entity's stage and training a generative pre-trained transformer ("GPT") network (e.g. a GPT-2 network) using these causally-significant features. Also, certain embodiments described herein improve the performance of automated content generation systems by, for example, using a GPT network that includes a causal loss function to capture a relationship between text and a stage of one or more stages toward a goal. Thus, the GPT network's predicted text content can be more useful than those provided by conventional solutions, particularly in contexts where, in order to be effective, one or more characteristics (e.g. a type, a style, a grammar, a format, or other characteristic) of generated text content varies among stages in a multi-stage objective.

The following non-limiting example is provided to introduce certain embodiments. In this example, an automated content generation system implementing a GPT network receives input data including an initial word or phrase and a stage identifier for a target entity for a multi-stage objective. In some examples, the multi-stage objective comprises a linear progression of stages from a beginning stage to an end stage through one or more intermediate stages. In some examples, the multi-stage objective comprises a cyclical progression that progresses from a beginning stage, through one or more intermediate stages, through an end stage, and back to the beginning stage, etc. In an example, the multi-stage objective is a marketing lifecycle including stages of an automation-qualified lead ("AQL") stage, a marketing-qualified lead ("MQL") stage, a sales-qualified lead ("SQL") stage, an opportunity lead stage, and a customer stage. The GPT network could be a GPT-1 architecture, GPT-2 architecture, GPT-3 architecture, or other GPT architecture. A target entity could be a reader or viewer that views content generated by the content generator system on a device or service that is accessible via an online environment.

Continuing with this example, an input vector that includes an input embedding (e.g. input keywords, a topic), a position embedding (e.g. position of each input keyword text in a sequence), a current stage identifier in a multi-stage objective for the target entity, and a target stage identifier in the multi-stage objective for the target entity is input to the GPT network, and the GPT network thereby generates text content for the target entity. In some instances, the automated modeling system implementing the GPT network produces, based on the input vector, output text for a template, where the template includes one or more text portions and one or more multimodal (e.g. images, video, sound) content portions. In some instances, once the GPT model generates output text based on an input vector and the output text is successively input into the GPT model to augment the output text. In certain embodiments, output text is successively input multiple times (e.g. twice, ten times, twenty times, or other number of times) into the GTP until a final output text is generated.

In certain embodiments, during a training phase, the GPT network is trained to generate text content that is predicted to be effective in transitioning a target entity from a current stage to a target stage in a multi-stage objective. In an example, the training data used for the training comprises an aggregated content history (e.g. content previously generated for multiple target entities) to identify features, from the content, that have an effect on a stage identifier associated with a target entity receiving the content. The content generator system retrieves, from a database or other data structure, the aggregated content history. In some instances, the aggregated content history includes interactions (e.g. email exchanges, chat exchanges, or other communication) between one or more content generators (e.g. marketers) and one or more target entities (e.g. marketing leads). For example, the aggregated content comprises chatbot (e.g. marketing chatbot) interactions between content creators and target entities. In certain examples, the content generator system labels the aggregated content history using the target stage identifier information. For example, the content generator system labels each transmitted content in the aggregated content history with a target stage identifier associated with a target entity receiving the content at a time of receiving the content. In some instances, specific interactions include a respective stage status label (with respect to a multi-stage objective) for a target entity receiving content in the respective interactions. As part of training the GPT network, the content generator system applies a cause-effect analysis to the labeled aggregated content to determine features that effect a transition from a starting stage to a target stage. For example, in some instances, in the labeled aggregate content history, a stage status changes from a current stage to a target stage within a predefined threshold of time from a time at which the target entity receives a particular content. Applying the cause-effect analysis includes using an average treatment effect mechanism to predict content features that have a significant impact on progression of a target entity to a successive target stage along the multi-stage objective. The content generator system estimates a causal effect on a target stage status in a multi-stage objective for varying various features (e.g. an average length of sentences, a distribution of parts of speech, etc.) of content. The cause-effect analysis predicts an effect of varying specific content features on a stage status of the multi-stage objective, while controlling for confounders (e.g. text embeddings, text features, etc.) that may have an indirect effect on the stage status through a treatment of interest. Controlling for such confounders enables the content generator system to isolate features that have a direct effect on the stage (in the multi-stage objective) of a target entity.

In certain embodiments, multiple loss functions are used for training the GPT network. For example, a first loss function (e.g. a causal loss function) is calculated to minimize an error between lexical and syntactic features of the input text and the output text and to minimize a loss between the predicted stage identifier output via the GPT model and a stage identifier predicted based on the lexical and syntactic features of the output text. Another loss function (e.g. a metric loss function) is used as feedback for a degree of metric (e.g. predicted stage identifier) control achieved during content generation. In some examples, an output token generated via the GPT model is input into a support vector machine (SVM), which extracts causally significant features from the output text. In some examples, the metric loss function is a cross entropy loss between (a) the input target stage and (b) the predicted target stage for the output text content that is determined based on the extracted causally significant features of the output text. The trained GPT model, trained on the aggregate content history, is able to generate, for the target entity, successive iterations of a developing output text along with a predicted stage identifier for the developing output text until a final output text is generated.

In some instances, once the final output text is generated using the GPT network (e.g. after one or more iterations of re-inputting developing output text as input text), the content generator system retrieves one or more multimodal content to add, along with the final generated output text, to a template. To select multimodal content, the content generator system compares the final output text generated via the GPT network to existing content (e.g. text in webpages, emails, etc.) in a database or other storage unit. In some instances, the content generator system represents the output text with one or more of word embeddings, topics/keywords extracted from the text, the target stage identifier associated with the final output text, and the lexical and syntactic features identified via the support vector machine model that effect the target stage identifier. The content generator system determines, from the stored multimodal content, a probability of each multimodal content being associated with each stage identifier of the multi-stage objective. The content generator system selects one or more multimodal content having a greatest probability of being associated with the predicted stage identifier associated with the final output text.

In some embodiments, the content generator system modifies features of an online computing environment based on the final output text and selected multimodal content for the target entity. In some instances, the content generator system assembles the final output text and selected multimodal content into the template and publishes the template so that it is accessible to the target entity. In some instances, an operator of the content generator system reviews the assembled template prior to publication to the target entity. In one example, content generator system provides access to an online tool, and the content generator system generates, for an operator of the content generator system, based on an input keyword sequence, a template including the final output text and selected multimodal content and provides the template for review by the operator for publishing to the target entity.

In certain embodiments, the GPT network comprises multiple layers including one or more layers referred to collectively as the embedding layer of the GPT network. In certain embodiments, the embedding layer receives information related to an input topic and keywords as input and generates a joint representation vector. In certain embodiments, the GPT network then, based upon the joint representation vector as well as a current stage identifier and a target stage identifier, predicts (a) output text and (b) a stage identifier associated with the output text.

The GPT network that generates an output text and a predicted stage identifier for the output text described herein provides several improvements and benefits over conventional techniques. In contrast to conventional techniques discussed above that that are merely focused on the generation of coherent language output, the GPT network described herein further enables generation of content that is guided by causally significant features that are learned from content that has proven to cause, upon display to a target entity, a desired change in a metric describing a target entity, whereas conventional techniques are unable to generate content that is effective in changing a metric (e.g. a measure of engagement) of the target entity. Particularly, content generated to effect a change in a metric associated with a target entity, as described herein, is superior to content outputs of conventional systems, providing a content generator with content output that is more likely to render a desired effect upon a target entity upon a viewing by the target entity.

Referring now to the drawings, FIG. 1 depicts computing environment for using generative pre-trained transformer networks to generate content predicted to transition a target entity from a current stage to a target stage of a multi-stage objective. The process depicted in FIG. 1 and described below is intended to be illustrative and non-limiting. Although FIG. 1 depicts the various processing blocks (e.g. content history extraction 140, cause effect analysis 150, input data generation 160, text generation 170, multimodal content generation 180, and text and multimodal content presentation 190) occurring in a particular sequence or order, this is not intended to be limiting. In certain alternative embodiments, the blocks may be performed in some different order or some blocks may also be performed in parallel. In certain embodiments, such as in the embodiment depicted in FIG. 1, various processing blocks may be performed by the content generator system 130. Other implementations, however, are possible. For example, one or more processing blocks may be performed by the content generator computing device 110 or the target user computing device 101. One or more computing devices (e.g., the content generator system 130, the content generator computing device 110, and/or the target user computing device 101) may implement operations depicted in FIG. 1 by executing suitable program code. The software or program code may be stored on a non-transitory storage medium (e.g., on a memory device).

The computing environment 100 includes a target user computing device 101, a content generator computing device 110, and a content generator system 130, which communicate via a network 120. In the example computing environment 100, the content generator system 130 and the content generator computing device 120 are separate systems. However, in certain embodiments, the content generator system 130 comprises the content generator computing device 110, the content generator computing device 110 comprises the content generator system 130, or the content generator system 130 and the content generator computing device 110 are components of another system or computing device. Accordingly, in certain embodiments, one or functions described herein as performed by the content generator system 130 or by a subsystem of the content generator system 130 (e.g. the text generator subsystem 133 and/or the multimodal content generator subsystem 135) are performed instead by the content generator computing device 110. Also, in certain embodiments, one or functions described herein as performed by the content generator computing device 110 or by a subsystem of the content generator computing device 110 (e.g. the application 114) are performed instead by the content generator system 130.

The target user computing device 101 includes a user interface 102, a data storage unit 103, and an application 104. In certain examples herein, the target user computing device 101 is associated with a target entity for which the content generator system 130 generates text content and multimodal content predicted to transition the target entity from a current stage to a target stage in a multi-stage objective. In certain examples, a content generator system 130 and/or the content generator computing device 110 communicates with multiple target user computing devices 101. The user interface 102 comprises a monitor device, a touchscreen user interface, a VR user interface, or other user interface 102 by which a user of the target user computing device 101 interacts with one or more applications of the target user computing device 101 via the user interface 102, for example, the application 104. In certain embodiments described herein, the user actuates one or more objects on the user interface 102 to perform operations including receiving content from the content generator system 130 and/or from the content generator computing device 110, viewing and/or interacting with content, and otherwise communicating with the content generator system 130 and/or the content generator computing device 110. The data storage unit 103 is accessible to the target user computing device 101. An example of a data storage unit 103 includes a local or remote data storage structure accessible to the target user computing device 101 suitable for storing information. The data storage unit 103 could store one or more content generated by the content generator system 130. The data storage unit 103 could store a content interaction history of the target user computing device 101 and the content generator computing device 110. The application 104 provides tools to view and/or interact with content generated by the content generator system 130 and received from the content generator computing device 110. In some examples, the application 104 communicates with the content generator system 130 and/or the content generator computing device 110 and is downloadable onto the target user computing device 101. In other examples, instead of interacting with an application 104 resident on the target user computing device 101, the user interacts with the application 104 on a website of the content generator system 130 via a web browser application.

The content generator computing device 110 includes a user interface 112, a data storage unit 113, and an application 114. In certain examples herein, the content generator computing device 110 is associated with a content generator system 130 and provides one or more inputs to the content generator system 130 to generate text content and multimodal content predicted to transition a target entity from a current stage to a target stage in a multi-stage objective. In certain examples, the content generator computing device 110 communicates with the content generator system 130 and/or the target user computing device 101 using a network 120. In some instances, an operator of the content generator computing device 110 is a content creator (e.g. a marketer) providing inputs to the content generator system 130 for the content generator system 130 to generate content for the target entity (e.g. a marketing lead) associated with the target user computing device 101. The user interface 112 comprises a monitor device, a touchscreen user interface, a VR user interface, or other user interface 112 by which an operator of the content generator computing device 110 interacts with one or more applications of content generator computing device 110 via the user interface 122, for example, the application 114. In certain embodiments described herein, the operator actuates one or more objects on the user interface 102 to perform operations including entering one or more keywords as input to generate, via the content generator system 130, text content and multimodal content for transmission to a target user computing device 101. The data storage unit 113 is accessible to the content generator computing device 110. An example of the data storage unit 113 includes a local or remote data storage structure accessible to the content generator computing device 110 suitable for storing information. The data storage unit 113 could store one or more content generated by the content generator system 130. The data storage unit 113 could store a content interaction history of the content generator computing device 110 with a target user computing device 101. The application 114 provides tools to interact with the content generator system 130 to generate content for a target user computing device 101. In some examples, the application 114 communicates one or more inputs (e.g. keywords) to the content generator computing device 110 to the content generator system 130. In certain examples, the application 114 is associated with and communicates with the content generator system 130 and is downloadable onto the content generator computing device 110. In other examples, instead of interacting with an application 114 resident on the content generator computing device 110, the operator of the content generator computing device 110 interacts with the application 114 on a website of the content generator system 130 via a web browser application of the content generator computing device 110.

The content generator system 130 includes a text generator subsystem 133, a multimodal content generator subsystem 135, and a data storage unit 137.

The text generator subsystem 133 generates, based on one or more inputs, output text content for a target entity associated with the target user computing device 101. The text generator subsystem 133 receives one or more inputs (e.g. one or more input keywords, a target stage identifier) from the content generator computing device 110. The text generator subsystem 133 determines one or more inputs by retrieving information (e.g. a current stage identifier for the target entity, a topic of a content interaction history) from a target entity profile stored on a data storage unit 137. In certain examples, the text generator subsystem 133 determines an input (e.g. a target stage identifier) based on another input (e.g. a current stage identifier). The text generator subsystem 133 uses a machine learning based framework (e.g. a neural network) that is trained to generate, based on the one or more inputs, output text predicted to cause, upon a viewing and/or interaction by the target entity with the content via the target user computing device 101, a transition of the target entity from a current stage in a multi-stage objective to a target stage in the multi-stage objective. In certain examples, the text generator subsystem 133 inserts multimodal content retrieved by the multimodal content generator subsystem 135 along with the output text into a template. The text generator subsystem 133 transmits the template including the output text and the retrieved multimodal content to the target user computing device 101. The text generator subsystem 133 can perform one or more operations associated with processes 140, 150, 160, 170, and/or 190 described in FIG. 1. The text generator subsystem 133 can perform one or more operations performed by the computing system 200 as described in FIG. 2. The text generator subsystem can perform one or more operations described in the methods of FIG. 3 and FIG. 4. In some examples, the text generator subsystem 133 uses the trained generative transformer network 500 described in FIG. 5 to perform one or more operations described herein.

The multimodal content generator subsystem 135 retrieves, based on the output text generated by the text generator subsystem 133 and from a data storage unit 137 (e.g. a content repository), multimodal content to associate with the output text. In certain examples, to select multimodal content, the multimodal content generator subsystem 135 compares the output text to existing content (e.g. text in webpages, emails, etc.) in the data storage unit 137 and select one or more multimodal content having a greatest probability of being associated with the predicted stage identifier associated with the output text. In certain examples, the multimodal content generator subsystem 135 inserts the retrieved multimodal content and the output text into a template. The multimodal content generator subsystem 135 transmits the template including the output text and the retrieved multimodal content to the target user computing device 101. The multimodal content generator subsystem 135 performs one or more operations described in processes 140, 180, and 190 of FIG. 1. The multimodal content generator subsystem 135 can perform one or more operations described in the method of FIG. 6.

The data storage unit 137 is accessible to the content generator system 130. An example of the data storage unit 137 includes a local or remote data storage structure accessible to the content generator system 130 suitable for storing information. The data storage unit 137 could store one or more content (e.g. output text and/or multimodal content) generated or otherwise retrieved by the content generator system 130. The data storage unit 137 could store a content interaction history of the content generator computing device 110 with a target user computing device 101. The data storage unit 137 could store an aggregated content interaction history of one or more content generator computing devices 110 with multiple target user computing devices 101. The data storage unit 137 could store information associated with one or more target entity profiles. Example target entity profile information could include a current stage identifier and/or a target stage identifier for a target entity.

The content generator system 130 communicates with the content generator computing device 110 and/or the target user computing device 101 via a network 120. Also, the content generator computing device 110 communicates with the content generator system 130 and/or the target user computing device 101 via the network 120. Also, the target user computing device 101 communicates with the content generator system 130 and/or the content generator computing device 110 via the network 120. The network 120 could include, but is not limited to, an internet, a local area network (LAN), a wireless area network, a wired area network, a wide area network (WAN), and the like. The data network 120 includes a wired or wireless telecommunication means by which network systems communicate and exchange data. For example, each data network is implemented as, or is a part of, a storage area network (SAN), a personal area network (PAN), a metropolitan area network (MAN), a LAN, a WAN, a wireless LAN (WLAN), a virtual private network (VPN), an intranet, an Internet, a mobile telephone network, a card network, a Bluetooth network, a Bluetooth low-energy (BLE) network, a near-field communication (NFC) network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that exists in a computer-based environment.

In certain embodiments, as depicted in the computing environment 100 of FIG. 1, the content generator system 130 executes processing steps including content history extraction 140, cause effect analysis 150, input data generation 160, text generation 170, multimodal content generation 180, and text and multimodal content presentation 190, which are described below. In certain embodiments, the content generator system 130 performs the processes 140, 150, 160, 170, 180, and 190 in response to receiving, from the content generator computing device 110, a request to generate content (e.g. a template including one or more text content sections and multimodal content sections) to transmit to the target user computing device 101.

The content generator system 130 performs content history extraction 140. For example, the content generator system 130 accesses content interaction histories 141 associated with (A) the user of the target user computing device 101 associated with the request to generate content and (B) users of one or more other target user computing devices 101. A content interaction history 141 includes communications between a content generator computing device 110 and the respective target user computing device 101. The communications in the content interaction history 141 includes one or more text and/or multimodal content transmitted by the content generator computing device 110 to the respective target user computing device 101. The communications in each content interaction history 141 includes one or more links (e.g. hyperlinks) transmitted by the content generator computing device to the target user computing device 101 to facilitate a display, via the respective target user computing device 101 (e.g. via an application 104), of one or more text and/or multimodal content responsive to selection of the link by the user of the target user computing device 101. For example, the content interaction history includes one or more email, short message service (SMS), multimedia message service (MMS), application communication service (e.g. received using an application 104 via the network 120), or other communications of content from the content generator computing device 110 to the target user computing device 101.

To perform the content history extraction 140, the content generator system 130 accesses stage information 143 associated with each of the users of the target user computing devices 101 for which aggregate content interaction history 141 was extracted. The stage information 143 includes, for each of the users and for each one or more time points, a stage identifier representing a stage in a multi-stage objective for the user corresponding to the respective time point. The content generator system 130 logs stage information 143 during communication between the content generator computing device 110 and the respective target user computing device 101. In certain examples, the content generator system 130 logs a timestamp and a stage identifier in response to receiving a request from the content generator computing device 110. For example, the content generator computing device 110 communicates content to the target user computing device 101 and receives information from the target user computing device 101 (e.g. a text response, one or more detected interactions with the transmitted content, or other information from the target user computing device 101) indicating that the user associated with the target user computing device 101 has transitioned from an initial stage of the multi-stage objective to a subsequent stage of the multi-stage objective that is different from the initial stage. In certain examples, the content generator system 130 automatically logs a stage identifier in response to the content generator computing device 110 receiving the information. In other examples, an operator of the content generator computing device 110 views the received information and requests that the content generator system 130 log a stage identifier for the user by providing one or more inputs to the user interface 112. In these examples, the content generator system 130 logs the stage identifier for the user in response to detecting the inputs to the user interface 112.

In certain examples, the content generator system 130 accesses a content interaction history 141 of multiple users, access aggregate stage information 143 of the multiple users, and generate a labeled aggregate content interaction history 141 based on the content interaction history 141 and stage information 143 of the multiple users. In certain examples, the content generator system 130 labels the content interaction history 141 of the multiple users with the stage information 143 to generate the labeled aggregate content interaction history 141. In certain examples, both the content interaction history 141 and the stage information 143 for each user is timestamped and each content transmitted to and/or displayed via target user computing devices 101 is labeled with the most-recently logged stage identifiers corresponding to both (A) a time prior to transmission of the content, which corresponds to a current stage, and (B) a time after transmission of the content, which corresponds to a target stage. For example, a stage identifier A for a user of a target user computing device 101 is logged at 08/05/ 2021—12:05 am, content V is transmitted to the user at 08/05/2021—12:07 am, and stage identifier B for the user is logged at 08/05/2021—12:10 am. In this example, content V is labeled with stage identifier A as the current stage and stage identifier B as the target stage.

The text generator subsystem 133 performs cause effect analysis 150 in the aggregate labeled content interaction history 141. For example, the text generator subsystem 133 determines a causal effect of transmitted content in the aggregated labeled content interaction history 141 with respect to a changes in stage identifier for users. In certain examples, the text generator subsystem 133 determines an effect of specific content features on changes in stage identifier, while controlling for confounding factors. Content features include syntactic features (e.g. count of parts of speech), surface-level textual features (e.g. a length of words, sentences, or paragraphs), or other features that have an effect on or contribute to a change in stage identifier. In an example, the cause effect analysis 150 determines that, for content, (1) less words per sentence and (2) more sentences is effective for a change in stage status for a user from a first stage identifier to a second stage identifier of the multi-stage objective. In this example, the feature of word count would have a negative effect on the outcome metric (the change in stage identifier from the first stage identifier to the second stage identifier) and a feature of sentence count would have a positive effect. In certain examples, the cause effect analysis 150 determines that particular features have a positive and/or negative effect on transitions between specific stage identifiers in the multi-stage objective. For example, a multi-stage objective could have three stages—stage A, stage B, and stage C—and cause effect analysis 150 determines that sentence count has a positive effect on a transition of a user from stage A to stage B but a negative effect for a transition of a user from stage B to stage C. In certain examples, performing the cause effect analysis 150 includes applying an average treatment effect approach. Further details about applying the average treatment effect approach are described in block 410 of FIG. 4 below.

The text generator subsystem 133 performs input data generation 160. For example, the text generator subsystem 133 generates or otherwise retrieves input data to use in a text generation 170 process. The input data could include a current stage identifier 165 for the user associated with the target computing device 101 and one or more keywords 163. The text generator subsystem 133 accesses the current stage identifier 165 for the user associated with the target computing device 101 from the data storage unit 147. For example, the content generator system 130 includes user profile data in the data storage unit 147 that includes the current stage identifier 165 for the user. In certain embodiments, the input data could further include a topic 161. In certain embodiments, the text generator subsystem 133 determines the topic 161 based on one or more activities of the target user computing device 101. For example, the user of the target user computing device 101 viewed content on customer journey orchestration that caused the user of the target user computing device 101 to enroll in a webinar, indicating an interest in the topic 161 of customer journey orchestration. In another example, the user of the target user computing device 101 was prompted to join a workshop on ad campaigning strategies and enrolls in the workshop, indicating an interest in the topic 161 of ad campaigning strategies. In some examples, the topic 161 is determined from the content interaction history 141, includes communications sent by the content generator computing device 110 to the target user computing device 101 about a product A that the operator of the content generator computing device 110 desires to sell to the target user computing device 101. In this example, the text generator subsystem 133 determines that the topic is "product A" based on the content interaction history 141. In certain examples, the text generator subsystem 133 extracts the topic 161 by applying one or more machine learning techniques to the content interaction history 141. In certain examples, the content interaction history 141 is labeled (e.g. by the operator of the content generator computing device 110) with the topic and the text generator subsystem 133 extracts the topic label from the content interaction history 141.

The text generator subsystem 133 receives the one or more keywords 163 from the content generator computing device 110 along with the request to generate content for the target user computing device 101. Keywords 163 could include one or more letters, characters, symbols, numbers, words, phrases, sentences, paragraphs, or other input keywords 163, or a combination thereof.

Figure 2:
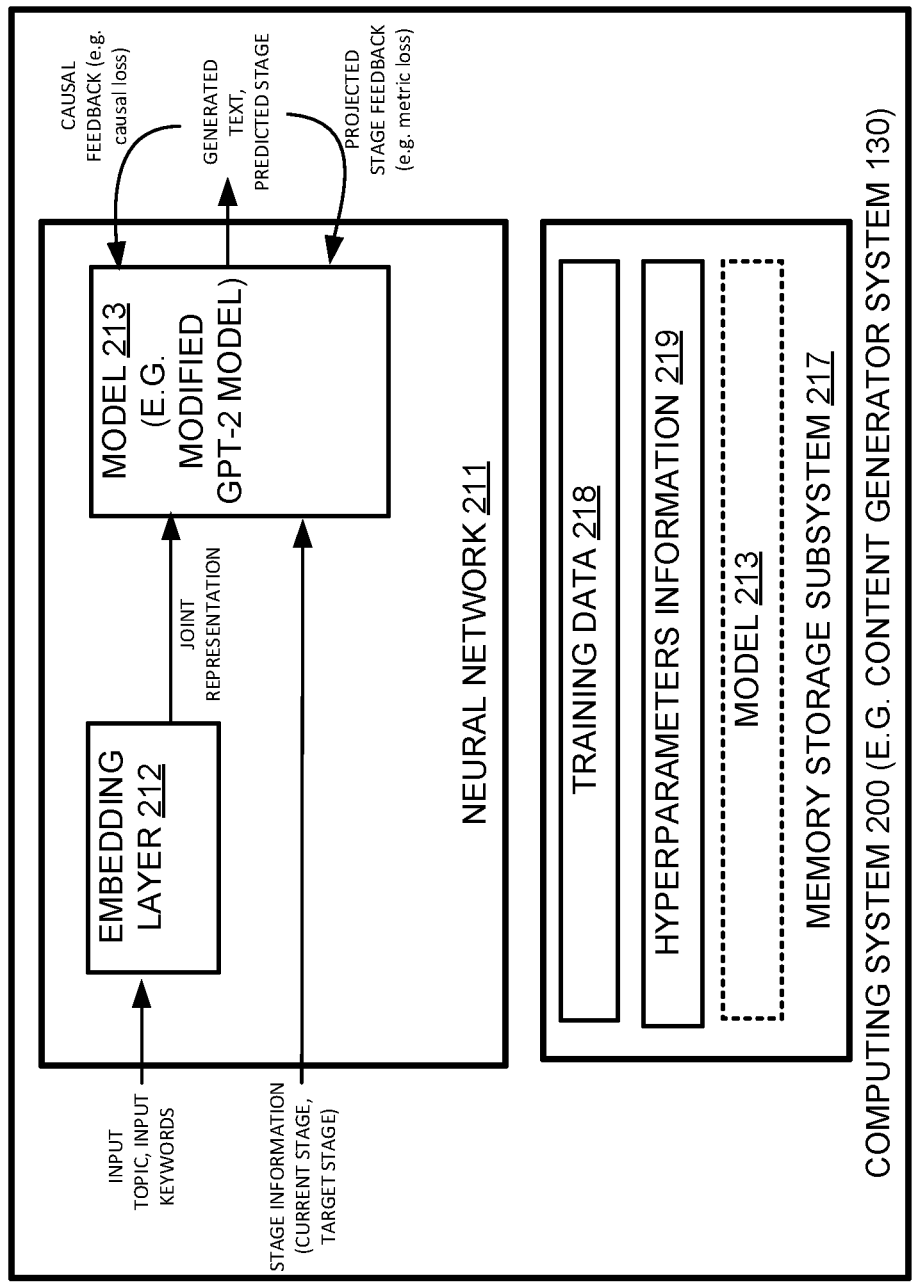
FIG. 2 depicts an example of a computing system that executes a neural network that is trained for generating text content predicted to transition a target entity from a current stage to a target stage of a multi-stage objective, according to certain embodiments disclosed herein.
Figure 3:
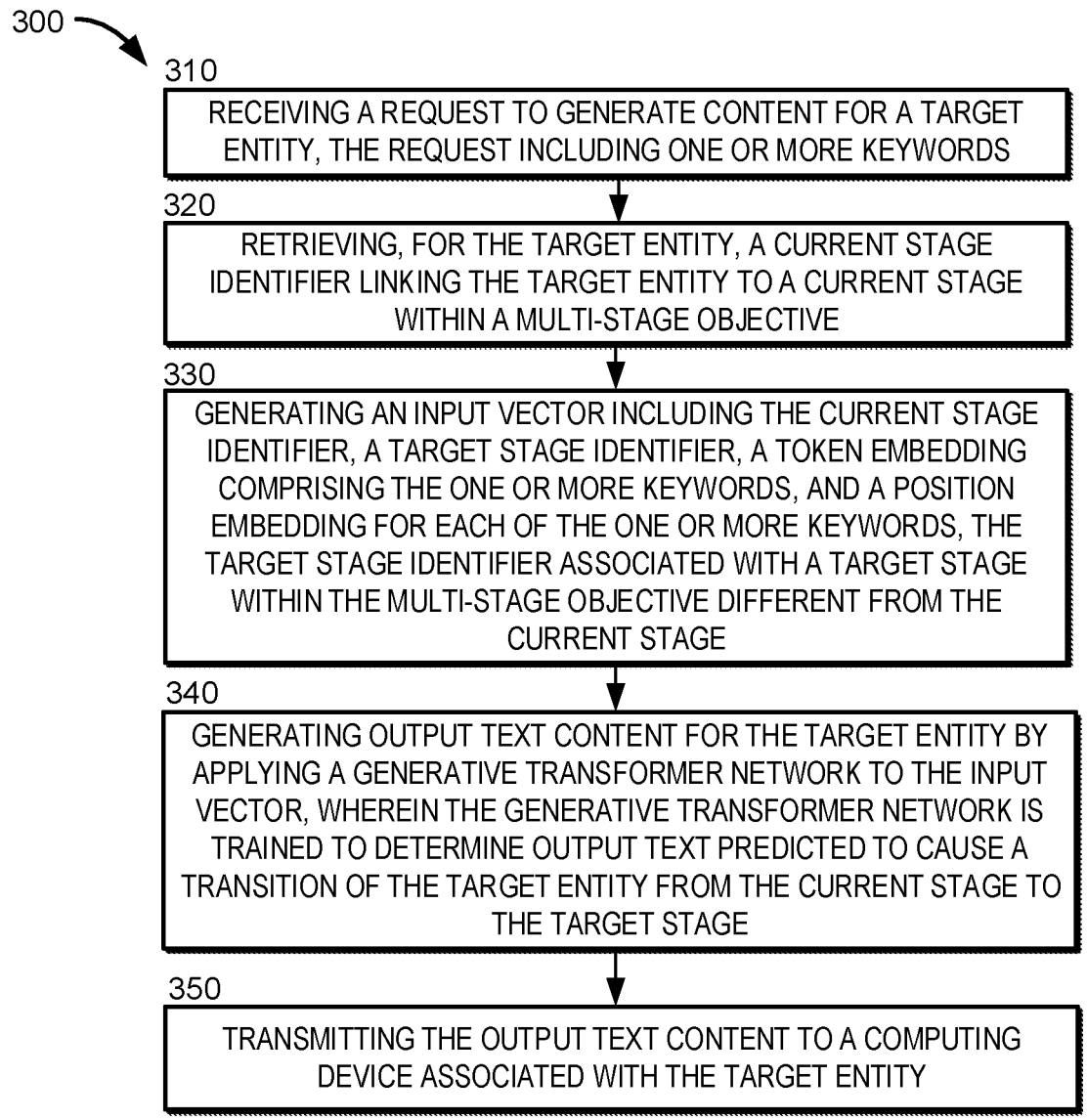
FIG. 3 depicts an example of a process for using a neural network to generate content predicted to transition a target entity from a current stage to a target stage of a multi-stage objective, according to certain embodiments disclosed herein.
Figure 4:
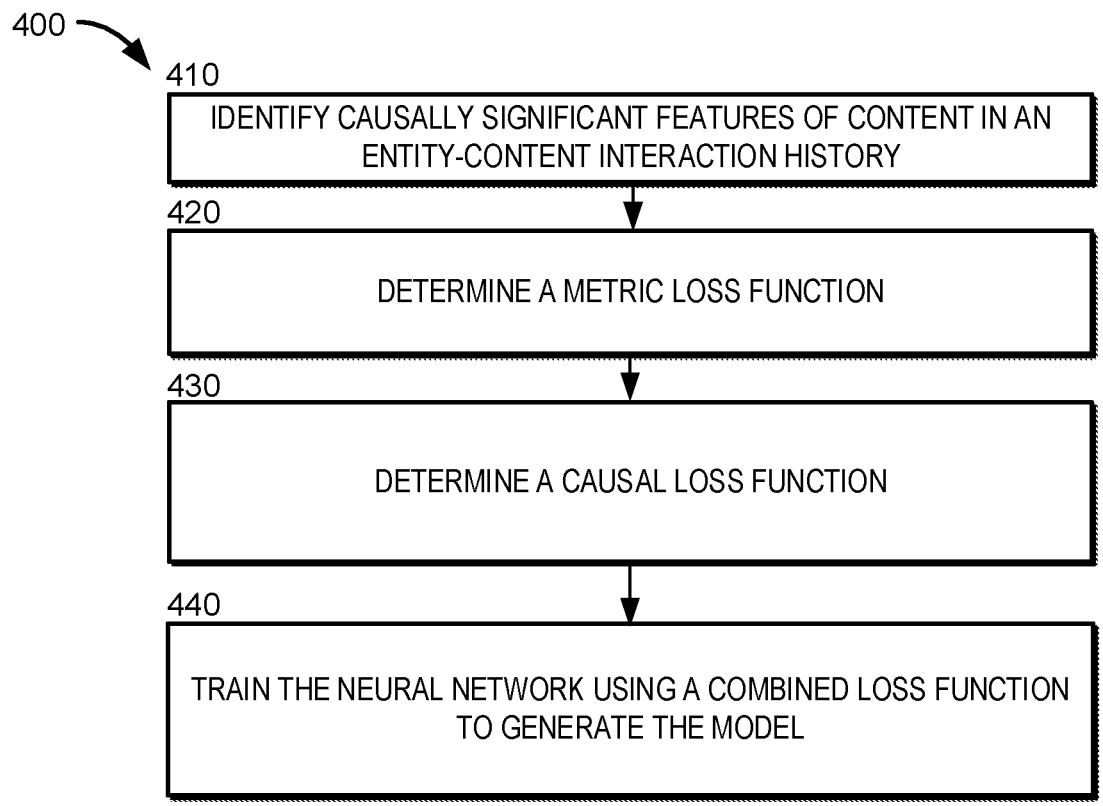
FIG. 4 depicts an example of a process for training a neural network to generate content predicted to transition a target entity from a current stage to a target stage of a multi-stage objective, according to certain embodiments disclosed herein.
Figure 5:
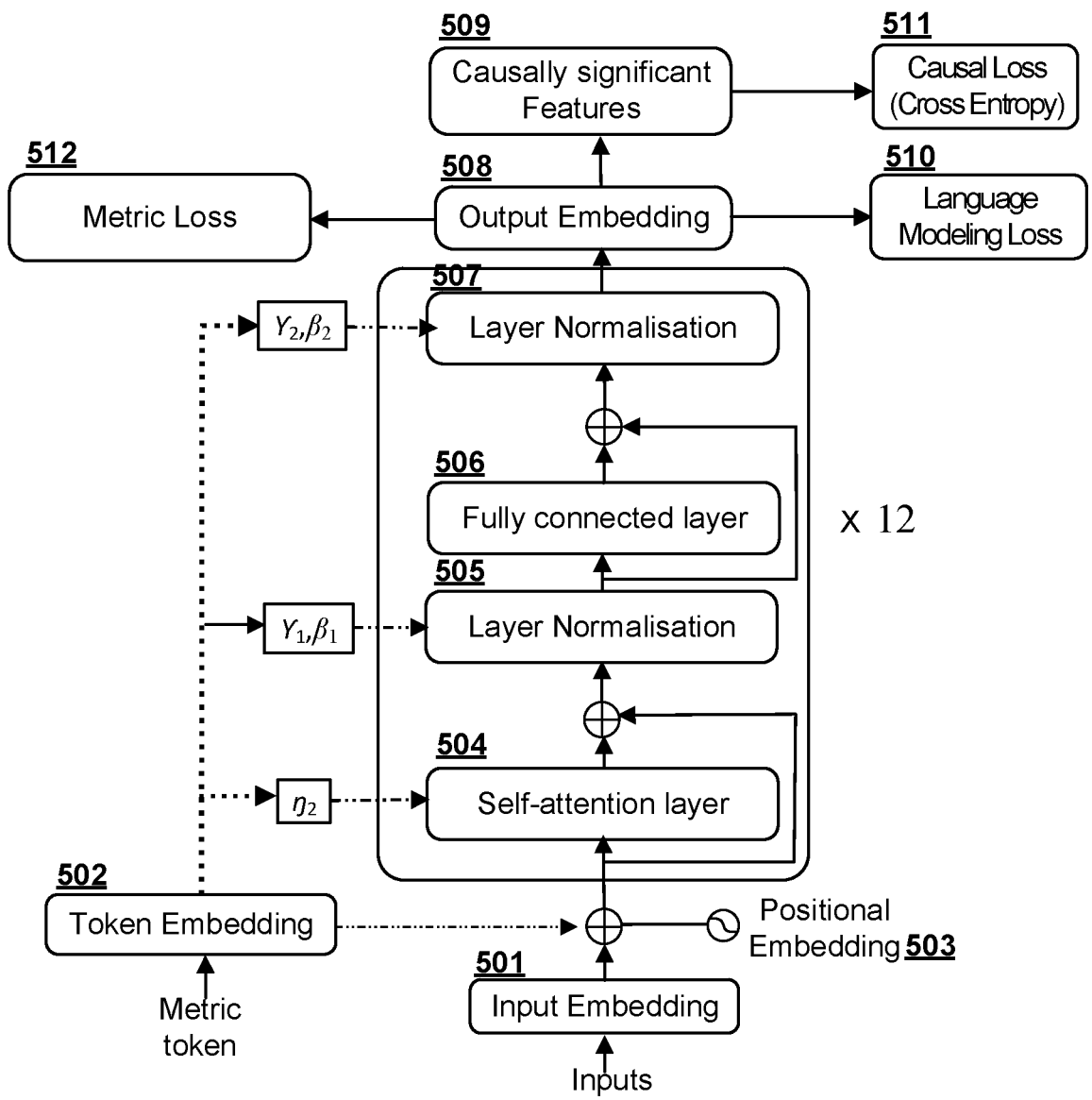
FIG. 5 depicts an example of a generative transformer neural network for implementing certain embodiments disclosed herein.

The text generator subsystem 133 performs text generation 170. For example the text generator subsystem 133, using at least part of the input data generated in the input data generation 160 (e.g. a current stage identifier 165, a topic 161, one or more keywords 163, and a target stage), generates output text 175. In certain examples, the text generator subsystem 133 generates the output text 175 to include in one or more text sections of a template. A template could be a multimodal web page including, for example, one or more of a title text section, a body text section, an image section, or a video section. Performing text generation 170 involves using a set of one or more neural networks 171 that are guided by a causal loss formulation to capture a relationship between developing output text 173 and a target metric (e.g. a target stage identifier) and identify key features that underlie the relationship, including causally significant features 153 in the developing output text 173 that correspond to the causally significant features 153 determined from the aggregate labeled content interaction history 141. In certain embodiments, performing the text generation 170 involves computing the average treatment effect between features of the developing output text 173 and the target stage identifier to identify the causally significant features, which are input to the neural network 171 to influence the generation of the developing output text 173 to arrive at the final output text 175. In certain examples, the neural network 171 comprises the neural network 211 depicted in FIG. 2. FIG. 2 depicts an example of a computing system that executes a neural network (e.g. a GPT-2 neural network) this is trained for generating text content that is effective in moving a target entity toward a successive target stage of a multi-stage objective, according to certain embodiments disclosed herein. Also, FIG. 3 depicts an example of a process for using generative pre-trained transformer networks, such as the neural network 171 or neural network 211 of FIG. 2, to automatically generate content that is effective in moving a target entity toward a successive target stage of a multi-stage objective, according to certain embodiments disclosed herein. Also, FIG. 4 depicts an example of a process for training the neural network of FIG. 2 to generate content that is predicted to transition a target entity toward a successive target stage of a multi-stage objective, according to certain embodiments disclosed herein. Further, FIG. 5 depicts an example of a generative transformer (GPT-2) network 500 that can be used for the neural network 171 or the neural network 211 of FIG. 2.

Figure 6:
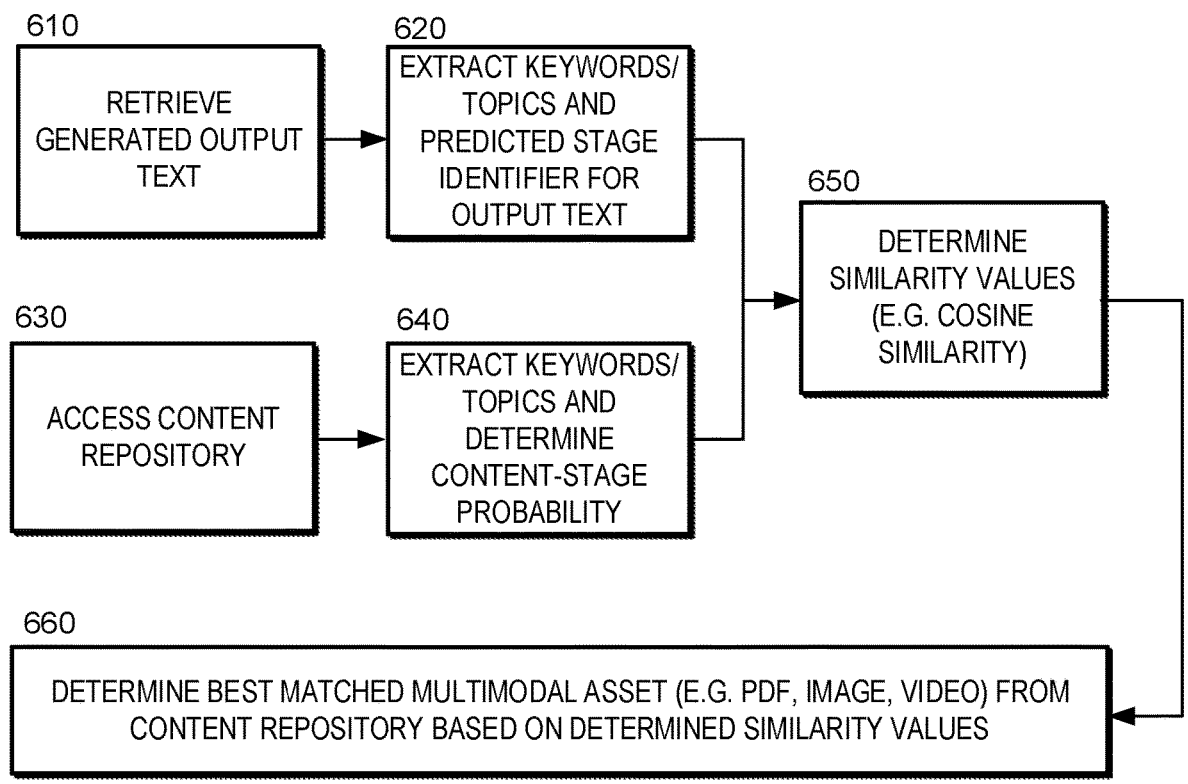
FIG. 6 depicts an example multimodal asset retrieval process, according to certain embodiments disclosed herein.

The multimodal content generator subsystem 135 performs multimodal content generation 180. In certain examples, once the text generator subsystem 133 generates output text 175 for one or more text sections of a template, the multimodal content generator subsystem 135 retrieves, using semantics of the output text 175, multimodal (e.g. non-textual) content 183 from a data storage unit 137 (e.g. a content repository) for the one or more multimodal sections of the template. For example, the text generator subsystem 133 generates output text 175 for one or more text sections (e.g. title text, body text of a template) of the template and the multimodal generator subsystem 135 retrieves multimodal content 183 for one or more multimodal content sections of the template. In an embodiment, the multimodal content generator subsystem 135 (A) from the output text 175 content, extracts one or more keywords, extracts one or more topics, and determines a target stage identifier, (B) for each content in the aggregated content interaction history 141, determines one or more keywords, determines one or more topics, and determines a target stage identifier probability, and (C) determines a similarity (e.g. a cosine similarity) between the keywords, topics, and target stage identifier for each content in the aggregated content interaction history 141 to the output text 175 content. In this embodiment, the multimodal content generator subsystem 135 identifies multimodal content (e.g. PDF, video, images, and other non-text content) from the aggregated content interaction history 141 using a similarity approach. The similarity approach could include using a similarity algorithm to match content in the aggregated content interaction history 141 to the output text 175 based on the similarity determined between the keywords, topics, and target stage identifier for each content in the aggregated content interaction history 141 to the output text 175 content, and then retrieving multimodal content 183 associated with the content in the aggregated content interaction history 141 having a greatest similarity to the output text 175. FIG. 6 depicts an example multimodal asset retrieval process, according to certain embodiments disclosed herein.

The content generator system 130 performs text and multimodal content presentation 190. The content generator system 130 (either the text generator subsystem 133 or the multimodal content generator subsystem 135) transmits, to the target user computing device 101, the output text 175 content and the retrieved multimodal content 183 and the target user computing device 101 displays the output text 175 content and the multimodal content 183 on a user interface 102 of the target user computing device 101. In certain examples, the content generator system 130 generates a template that includes the output text 175 and the multimodal content 183 and transmits the template to the target user computing device 101 for display via the user interface 102. The content generator system 130 transmits the output text 175 content and the retrieved multimodal content 183 to the target user computing device 101 in response to receiving, from the content generator computing device 110, the request to generate content for the target user computing device 101.

FIG. 2 depicts an example of a computing environment including a computing system 200 that executes a neural network this is trained for generating text content that is effective in moving a target entity toward a successive target stage of a multi-stage objective. FIG. 2 is described herein with reference to certain components depicted in FIG. 1. In certain embodiments, the neural network 211 of FIG. 2 is trained for performing one or more of the processes 140, 150, 160, and 170 described in FIG. 1. In certain embodiments, the content generator system 130 depicted in FIG. 1 includes the computing system 200 depicted in FIG. 2. In other embodiments, the content generator system 130 and its subcomponents and subsystems are a component of the content generator computing device 110 and the content generator computing device 110 includes the computing system 200 depicted in FIG. 2. The target entity could be a user associated with a target user computing device 101 for which the computing system 200 generates text content.

In the embodiment depicted in FIG. 2, a machine learning based framework is implemented using the neural network 211, for example, a generative pre-trained transformer network. The computing system 200 depicted in FIG. 2 is merely an example and is not intended to unduly limit the scope of claimed embodiments. One of ordinary skill in the art would recognize many possible variations, alternatives, and modifications. For example, in some implementations, the neural network 211 can be implemented by using more or fewer systems or subsystems than those shown in FIG. 2, by combining two or more subsystems, or by having a different configuration or arrangement of systems or subsystems.

As depicted in FIG. 2, an input topic 161, one or more input keywords 163, current stage identifier 165 associated with a target entity, and target stage information are provided as input to the neural network 211. The topic 161 could include a subject of a content interaction history between the content generator computing device 110 and the target user computing device 101, for example, a product or service that an operator of the content generator computing device 110 is attempting to sell to or otherwise generate interest in for the target entity. The one or more keywords 163 could include inputs received by the content generator system 130 from the content generator computing device 110. For example, as shown in FIG. 1, the content generator system 130 could receive, via the network 120, the one or more keywords 163 from the content generator computing device 110 responsive to an operator of the content generator computing device 110 inputting the keywords 163 via the user interface 112 of the content generator computing device 110.

The current stage identifier 165 could be associated with a user profile of the user associated with the target user computing device 101 for which the computing system 200 is generating text content. In certain examples, the computing system 200 retrieves the current stage identifier 165 from the memory storage subsystem 217. The current stage identifier 165 and the target stage identifier are selected from a set of stage identifiers associated with a multi-stage objective. A stage identifier (e.g. current stage identifier 165 or target stage identifier) associated with a target entity provide a category or class for the target entity with respect to the multi-stage objective. In certain examples, the computing system 200 determines the target stage identifier as a stage identifier that is successive to the current stage identifier in the multi-stage objective. For example, the multi-stage objective includes stage identifiers A, B, C, D, E, the current stage identifier is C, and the target stage identifier is D. In certain examples, the target stage identifier is not associated with a stage that is successive to the current stage associated with the current stage identifier. For example, the multi-stage objective includes stage identifiers A, B, C, D, E, the current stage identifier is C, and the target stage identifier is E. In certain examples, the current stage identifier 165 is retrieved by the computing system 200 from the memory storage subsystem 217.

Upon determining the input topic, receiving the one or more input keywords and the current stage identifier 165 of the target entity, and determining the target stage identifier, the neural network 211, which has been previously trained, is configured to iteratively generate a developing output text 173 and predict a stage identifier for the developing output text 173. The generated developing output text 173 comprise one or more characters, words, sentences, symbols, paragraphs, or other text. The predicted stage identifier for the developing output text 173 are selected from the set of stage identifiers for the multi-stage objective.

In certain embodiments, the embedding layer 212 of the neural network 211 is trained to generate a joint representation based on the input topic and the one or more input keywords. For example, the joint representation is a concatenation of the input topic and the one or more keywords. In another example, the joint representation is an average representation of the input topic and the one or more input keywords.

In certain examples, the trained neural network 211 generates, based on the joint representation, the current stage identifier, and the target stage identifier, an output embedding from which developing output text 173 and a predicted stage identifier for the developing output text 173 are determined. The trained neural network 211 applies one or more functions to the output embedding to determine the developing output text 173 and the predicted stage identifier for the developing output text 173. In certain examples, the neural network 211 iteratively for a number of iterations, (a) receives subsequent input including the current developing output text 173 and the predicted stage identifier for the current developing output text 173 and (b) generates an augmented developing output text 173 and a subsequent predicted stage identifier for the augmented developing output text 173. The augmented developing output text 173, in some instances, can include the previous developing output text 173 plus one or more additional text. In some instances, the augmented developing output text 173 includes and preserves an order of the previous developing output text 173. For example, the previous output text included phrase "A B" and the augmented developing output text 173 includes phrase "C A B," where A, B, and C each represent one or more output letters, symbols, characters, words, phrases, or other text. However, in other instances, the augmented developing output text 173 includes but does not preserve an order of the previous developing output text 173. For example, the previous developing output text 173 included phrase "A B" and the augmented developing output text 173 includes phrase "A C B." In certain examples, the predicted stage identifier for the developing output text 173 represents a stage identifier for the target entity representing a stage of the multi-stage objective that the target entity is predicted to enter (or remain in) upon viewing the generated developing output text 173. In certain examples, to generate a final output text 175, the neural network 211 iteratively augments the developing output text 173 and determines an associated predicted stage identifier until a special token is generated by the neural network 211 that identifies an end of the final output text 175 or until a number of words, characters, or other measure of a length of the output text reaches a maximum length condition. In these examples, the neural network 211 determines the maximum length condition.

The neural network 211 may be implemented using software (e.g., code, instructions, program) executed by one or more processing units (e.g., processors, cores), hardware, or combinations thereof. The software may be stored on a non-transitory storage medium (e.g., on a memory device). The neural network 211 may comprise multiple layers. For example, the neural network 211 may include one or more self-attention layers and one or more normalization layers. In the example embodiment depicted in FIG. 2, the neural network 211 comprises an embedding layer 212 and a model 213. The model 213 may be a generative transformer model, for example, a GPT-2 model 213. The structure of neural network 211 depicted in FIG. 2 is meant as an example and is not intended to be restrictive. The neural network 211 and/or model 213 may also comprise other layers and networks not shown in FIG. 2. In some embodiments, the neural network 211 includes a self-attention layer with a modified compatibility function that biases attention scores with respect to the input target stage identifier. In some embodiments, the neural network 211 includes a normalization layer with scale and bias parameters that are influenced by the target stage identifier.

The neural network architecture 211 described herein is an example and other neural network architectures that can be trained to generate text given an input of a stage identifier may be utilized by the computing system 200 in addition to or instead of a GPT network architecture. Further, the functions described herein to determine the generated text and predicted stage identifier are examples, and other functions may be used as appropriate. Further, in certain examples, one or more outputs of the neural network 211, states of the neural network 211, or values determined by the neural network 211 (e.g. an output embedding) may be used to determine the generated output text and the predicted stage identifier using appropriate functions to derive such outputs. FIG. 5 depicts an example of a generative transformer (GPT-2) network 500 for implementing certain embodiments described herein and, in certain embodiments, the neural network 211 comprises the generative transformer network 500 of FIG. 5.

The neural network 211 is trained to perform the developing output text 173 generation (including the final output text 175 after generating the developing output text 173 for a number of iterations) and stage identifier prediction operations. For example, the neural network 211 is trained using training data 118 that is stored in a memory storage subsystem 217 of computer system 200. A training framework is provided for training the neural network 211. Example training data 218 comprises one or more of aggregate content interaction history 141 information for multiple users, aggregate stage information 143 for multiple users, aggregate content interaction history 141 labeled with aggregate stage information 143, content history features 151, causally significant features 153, or other training data 218. In certain examples, training data 218 includes data determined by the content history extraction 140 and cause effect analysis 150 operations described in FIG. 1. Hyperparameters information 219 is related to various hyperparameters used during the training phase is also stored in the memory storage subsystem 217. Example hyperparameters information 219 comprises one or more hyperparameters by which to train the neural network 211 over a training period, for example, a learning rate, a batch size, or and/other hyperparameters information 219. In certain embodiments, supervised training techniques are used to train the neural network 211 to generate output text 175.

As part the training of the neural network 211, one or more loss functions (e.g. a causal loss function, a metric loss function) are defined and then optimized during the training phase to set weights, biases, and other model parameters for the neural network 211. The neural network 211 is also trained using a causal feedback based on the developing output text 173 and a projected stage feedback based on the predicted stage identifier associated with developing output text 173. In this manner, the neural network 211 is trained to become a framework or model for generating developing output text 173 along with a predicted stage identifier for the developing output text 173. In some embodiments, the neural network 211 includes a self-attention layer with a modified compatibility function that biases attention scores with respect to the input target stage identifier. In some embodiments, the neural network 211 includes a normalization layer with scale and bias parameters that are influenced by the target stage identifier. In some embodiments, including the target stage identifier as a control in the input vector, in the self-attention mechanism, and/or in the layer normalization guides the GPT network to generate content aimed to move the target entity toward a target stage associated with the target stage identifier.

FIG. 3 depicts a process 300 for using a neural network to generate content predicted to transition a target entity from a current stage to a target stage of a multi-stage objective, in accordance with certain embodiments described herein. One or more computing devices (e.g., the content generator system 130) implement operations depicted in FIG. 3 by executing suitable program code. The software or program code may be stored on a non-transitory storage medium (e.g., on a memory device). The process depicted in FIG. 3 and described below is intended to be illustrative and non-limiting. Although FIG. 3 depicts the various processing blocks occurring in a particular sequence or order, this is not intended to be limiting. In certain alternative embodiments, the blocks may be performed in some different order or some blocks may also be performed in parallel. For illustrative purposes, the process 300 is described with reference to certain examples depicted in FIG. 1. Other implementations, however, are possible. In certain embodiments, process 300 may use the computing system 200, including the neural network 211, of FIG. 2 to perform one or more operations described herein. In certain embodiments, the process 300 may use the generative transformer network 500 described in FIG. 5 to perform one or more operations described herein.

At 310, the process 300 involves receiving, by the text generator subsystem 133, a request to generate content for a target entity, the request including one or more keywords. For example, the target entity is a user associated with a target user computing device 101 and the request to generate content is received from a content generator computing device 110 associated with an operator of the content generator computing device 110. In certain examples, the content generator computing device 110 has previously transmitted (or instructed the content generator system 130 to transmit) content to the target user computing device 101. In some examples, the content generator computing device 110 has previously communicated with (or instructed the content generator system 130 to transmit) the target user computing device 101 in a chat session, email or message exchange, or other communication with the target user computing device 101 to transmit content to the target user computing device 101. The operator of the content generator computing device 110, in some instances, may desire to transmit subsequent content to the target user computing device 101 and inputs one or more keywords 163 to the content generator computing device 110 via the user interface 112. The content generator computing device 110 receives the one or more input keywords 163 and transmits the one or more keywords 163 to the content generator system 130 along with a request to generate content for the target entity. In certain embodiments, the text generation subsystem 133 receives the request to generate content including the one or more keywords 163.

In certain embodiments, the request to generate content includes a template defining one or more text portions and one or more multimodal (e.g. images, video, sound) content portions and a request to generate output text for one or more of the one or more text portions of the template. In other examples, the request to generate content includes a template identifier and the content generator system 130 extracts, from the data storage unit 137, the template associated with the template identifier. In other examples, the content generator system 310 selects a template from the data storage unit 137 or uses a default template. Text portions could include a title portion and a body portion. For example, the template could be a template for a multimedia presentation slide that includes a title text section, a body text section, and one or more portions for multimodal content. The multimodal content could include video content, image content, data structure content (e.g. a table, a graph), a hyperlink, or other non-text content.

At 320, the process 300 involves retrieving, by the text generator subsystem 133 for the target entity, a current stage identifier linking the target entity to a current stage within a multi-stage objective. The text generator subsystem 133 may extract, from the data storage unit 137, a content interaction history 141 associated with the target entity that includes content previously transmitted to the target user computing device 101. The text generator subsystem 133 may extract, from the data storage unit 137, stage information 143 for the target entity that includes a current stage identifier 165 of the multi-stage objective for the target entity. In certain examples, the text generation subsystem 133 retrieves the current stage identifier for the target entity.

At 330, the process 300 involves generating, by the text generator subsystem 133, an input vector including the current stage identifier, a target stage identifier, a token embedding comprising the one or more keywords, and a position embedding for each of the one or more keywords, the target stage identifier associated with a target stage within the multi-stage objective different from the current stage. The text generator subsystem 133 may generate the token embedding and position embedding for each of the one or more keywords. For example, the position embedding indicates a position of each input keyword 163 text in the input one or more keywords 163. In some examples, the input vector is a concatenation of the current stage identifier, the target stage identifier, a token embedding comprising the one or more keywords, and a position embedding for each of the one or more keywords.

In some examples, the text generator subsystem 133 receives the target stage identifier from the content generator computing device 110 along with the one or more keywords and the request to generate content. In some examples, the operator of the content generator computing device 110 inputs the target stage identifier or otherwise selects, via the user interface 112, the target stage identifier from a set of stage identifiers of the multi-stage objective. For example, the multi-stage objective includes stages A, B, C, D, E, the current stage identifier 165 for the target entity extracted from the stage information 143 is stage B, and the text generator subsystem 133 receives a target stage identifier of stage D from the content generator computing device 110 along with the one or more keywords. In this example, the text generator subsystem 133 identifies stage D as the target stage identifier based on the target stage identifier received from the content generator computing device 110.

In other examples, the text generator subsystem 133 determines the target stage identifier based on the current stage identifier. In some instances, the text generator subsystem 133 determines a target stage of the multi-stage objective that follows the current stage associated with the current stage identifier and determines the target stage identifier as a stage identifier that is associated with the target stage. In an example, the multi-stage objective includes successive stages A, B, C, D, E, and the current stage identifier 165 for the target entity extracted from the stage information 143 is B. In this example, the text generator subsystem 133 determines, based on the current stage identifier 165 of stage B, that the target stage identifier is stage C since stage C follows stage B in the multi-stage objective.

In some examples, the text generator subsystem 133 generates the input vector based on the current stage identifier, the target stage identifier, a token embedding comprising the one or more keywords, and a position embedding for each of the one or more keywords, and further based on a topic. The text generator subsystem 133 may extract the topic 161 from the content interaction history 141 of the target entity. For example, the content interaction history 141 includes communications sent by the content generator computing device 110 (or by the content generator system 130) to the target user computing device 101 about a product A that the operator of the content generator computing device 110 desires to sell to the target user computing device 101 In this example, the text generator subsystem 133 determines that the topic is "product A." In certain examples, the text generator subsystem 133 may extract the topic 161 by applying one or more machine learning techniques to the content interaction history 141. In certain examples, the content interaction history 141 is labeled (e.g. by the operator of the content generator computing device 110) with the topic and the text generator subsystem 133 extracts the topic label from the content interaction history 141.

At block 340, the process 300 involves generating, by the text generator subsystem 133, output text content for the target entity by applying a generative transformer network to the input vector, wherein the generative transformer network is trained to determine output text predicted to cause a transition of the target entity from the current stage to the target stage. In certain examples, generating the output text involves applying the generative transformer network (e.g. neural network 171, neural network 211, generative transformer network 500) to the input vector. In certain examples, the generative transformer network iteratively generates output tokens comprising a developing output text 173, one output token at a time. In these examples, for each iteration, the latest generated output token is added to the input vector and the input vector is re-input into the generative transformer network as input to generate a subsequent developing output text 173. In some examples, a subsequent input vector is determined based on one or more of the current stage identifier, the target stage identifier, a text embedding based on words of the developing output text 173, and a position embedding for each word of the developing output text 173. In certain examples, the final output text of the generative transformer network is the developing output text 173 is reached when the generative transformer network generates a special output token indicating an end of the text or the generated output text reaches a maximum length limit. In these examples, the generative transformer network determines the maximum length limit. The sequence of output tokens generated by the generative transformer network is the final output text 175. In some embodiments, the text generation subsystem 133 generates the output text 175 for the target entity by applying the generative transformer network. In some embodiments, the content generator system 130 generates the output text 175 using the neural network 211 as described in FIG. 2. FIG. 4 describes a method to train the neural network 211 of FIG. 2. In certain examples, the neural network 211 comprises the generative transformer network 500 (e.g. GPT-2 network) described in FIG. 5.

At block 350, the process involves transmitting, by the text generator subsystem 133, the output text content to a computing device associated with the target entity. In certain examples, the text generator subsystem 133 may transmit the output text 175 to the target user computing device 101 associated with the target entity. In certain embodiments, the request to generate content includes a template defining one or more text portions and one or more multimodal (e.g. images, video, sound) content portions and the content generator system 130 inserts the output text 175 into the one or more text portions of the template before transmitting the template to the target user computing device 101. In certain examples, the text generator subsystem 133 formats the generated output text 175 after inserting it into appropriate portions of the template based on a format specified by the template. For example, the template defines, for each text portion, a font and/or other text treatments (e.g. a text color, a text size, a line spacing, margins, an indentation, a text orientation, an underline treatment, a bold treatment, an italic treatment, a highlighting treatment, a capitalization treatment, a cross through treatment, a bulleted or numerical list treatment, and/or other text treatment) for each text section.

In certain examples, the content generator system 130, in addition to generating the output text 175 using the text generator subsystem 133, also retrieves, using the multimodal content generator subsystem 135, one or more multimodal assets (e.g. multimodal content) prior to transmitting the output text 175 to the target user computing device 101. In certain examples, the content generator system 130 inserts the retrieved multimodal content into a multimodal content section of the template. FIG. 6 depicts an example multimodal asset retrieval process, according to certain embodiments disclosed herein.

In certain examples, the multimodal content generator subsystem 135 transmits the output text 175 (e.g. the template comprising the output text 175) to the target user computing device 101 for display via the target user computing device 101. The target user computing device 101 receives the output text 175 and displays, via the user interface 102, the output text 175. In certain examples, the target entity associated with the target user computing device 101 views the output text 175 or otherwise interacts with the template that includes the output text 175 via the target user computing device 101. In certain examples, the content generator system 130 receives a request or other communication (e.g. selection of a link) from the target user computing device 101 that indicates that the target entity transitioned to a stage of the multi-stage objective other than the stage associated with the current stage identifier (e.g. the target entity transitioned to the target stage associated with the target stage identifier). In certain examples, the content generator system 130 logs, in response to receiving the request or other communication from the target user computing device, logs a current stage identifier for the target entity. In certain examples, the content generator computing device 110 receives, from the target user computing device 101, one or more communications indicating that the target entity viewed the output text 175 (or template that includes the output text 175) and indicating that the target entity transitioned to a subsequent stage other than the current stage. In these examples, in response to receiving an input from the operator of the content generator computing device 110, the content generator computing device 110 transmits, to the content generator system 130, a request to log the subsequent stage identifier for the target entity. In these examples, the content generator system 130 receives the request and logs the subsequent stage identifier for the target entity.

FIG. 4 depicts an example of a process 400 for training a neural network (e.g., neural network 211 depicted in FIG. 2) to predict output text and to predict a stage identifier for the output text, according to certain embodiments. The processing depicted in FIG. 4 may be implemented in software (e.g., code, instructions, program) executed by one or more processing units (e.g., processors, cores of content generator system 130 depicted in FIG. 1) of the respective systems, hardware, or combinations thereof. The software may be stored on a non-transitory storage medium (e.g., on a memory device). The process 400 depicted in FIG. 4 and described below is intended to be illustrative and non-limiting. Although FIG. 4 depicts the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 2, the processing depicted in FIG. 4 may be performed by the computing system 200 of FIG. 2. For illustrative purposes, the process 400 is described with reference to certain examples depicted in FIG. 1 and FIG. 2. Other implementations, however, are possible.

In certain examples, the computing system 200 provides a training infrastructure that is used to train the neural network 211 over a training period using training data 218. Various hyperparameters information 219 may be set to facilitate and guide the training. The training of the neural network 211 produces a model 213 (e.g. a GPT-2 model) that can, given an input vector based on a current stage identifier, a target stage identifier, a topic, and one or more keywords, generated output text and predict a stage identifier for the generated output text. In certain embodiments, the training of the neural network 211 involves training the embedding layer 212 to generate vector representations (e.g. a joint representation) for the input topic and one or more input keywords. For purposes of simplicity, FIG. 4 focuses on training done for the predicting output text and predicting a stage identifier for the output text operations.

In certain examples, the neural network 121 comprises a generative transformer network (e.g. a GPT-2 network). Training data 218 stored in the memory storage subsystem 217 may be used for training the neural network 211, including training the model 213. The training data may comprise aggregate content interaction history 141 for multiple target user computing devices 101 including text content transmitted by the content generator system 130 to the multiple target user computing devices 101 over a time period. Each text content in the aggregate content interaction history 141 may include time stamp data indicating a time of transmission of the respective content to a respective target user computing device 101, a time of reception via the target user computing device 101, and/or a time of interaction via the target user computing device 101 with the content (e.g. by the target entity). Training data may comprise stage information for the multiple target user computing devices 101 including a history of stage identifiers associated with target entities corresponding to each of the multiple target user computing devices 101. The stage information for a target user computing device 101 may include, for each stage identifier in the history of stage identifiers, a time stamp indicating a time at which the target entity transitioned to a stage associated with the stage identifier. Training data may include content history features 151 for the aggregate content interaction history 141 and causally significant features 153 determined from the content history features 151, as described in the cause effect analysis 150 processing described in FIG. 1. Training data is used for training the neural network to perform a prediction of output text as well as a prediction of a stage identifier associated with the output text.

Various hyperparameters 219 may be specified for guiding the training operation such as, for example, a learning rate, a batch size, a cluster size, etc. During the training period, various techniques, such as back propagation and optimization techniques are used to optimize model 213 parameters of the neural network 121, such as weights and bias terms. This optimization may be performed by minimizing one or more loss functions to generate a model 213 that can both predict output text and a stage identifier for the output text. In certain examples described herein, multiple loss functions are used, where the multiple loss functions include one or more loss functions for training the neural network for generating output text predicted to transition the target entity from a current stage to a target stage (e.g. causal loss function) and one or more loss functions for training the neural network 211 to predict a stage identifier for the output text (e.g. metric loss function). In certain embodiments, during the training period, the computer system 200 uses optimization techniques (e.g., back propagation techniques) to optimize the one or more loss functions, which in turns results in weights and biases associated with the different layers of the neural network 211 to be optimized for predicting output text and a stage identifier for the output text The processing depicted in FIG. 4 provides an example of a method that may be used to train the neural network 121 using a causal loss function and a metric loss function. Other loss functions may be used instead of or in addition to the example loss functions described in process 400. Further, the computing system 200 may use additional equations from those described herein, separate equations from those described herein, and/or modified equations with respect to those described herein in process 400 to train the neural network 121. Also, the one or more loss functions may be determined based on additional loss functions, alternate loss functions, or an alternate combination of loss functions than those of the example combined loss function described in process 400.

At 410, the process 400 involves identifying causally significant features 153 of an aggregate content interaction history 141. The text generator subsystem 133 performs cause effect analysis 150 in the aggregate labeled content interaction history 141. For example, the text generator subsystem 133 determines a causal effect of transmitted content in the aggregated labeled content interaction history 141 with respect to a changes in stage identifier for users. In certain examples, the text generator subsystem 133 determines an effect of specific content features on changes in stage identifier, while controlling for confounding factors. Content features may include syntactic features (e.g. count of parts of speech), surface-level textual features (e.g. a length of words, sentences, or paragraphs), or other features that may have an effect on or contribute to a change in stage identifier. In an example, the cause effect analysis 150 may determine that, for content, (1) less words per sentence and (2) more sentences is effective for a change in stage status for a user from a first stage identifier to a second stage identifier of the multi-stage objective. In this example, the a feature of word count would have a negative effect on the outcome metric (the change in stage identifier from the first stage identifier to the second stage identifier) and a feature of sentence count would have a positive effect. In certain examples, the cause effect analysis 150 may determine that particular features have a positive and/or negative effect on transitions between specific stage identifiers in the multi-stage objective. For example, a multi-stage objective could have three stages—stage A, stage B, and stage C—and cause effect analysis 150 may determine that sentence count has a positive effect on a transition of a user from stage A to stage B but a negative effect for a transition of a user from stage B to stage C.

In certain examples, performing the cause effect analysis 150 includes applying an average treatment effect approach. In certain embodiments, when applying the average treatment effect approach, an outcome metric (e.g. a change in stage identifier for the multi-stage objective) is a target value. A hypothetical change in an input feature of observed data is defined as an intervention, and an input feature in question is termed a treatment variable (t). For a binary treatment, the effect of treatment on an outcome (y) is defined as $y_1(x_i) - y_0(x_i)$ for the $i^{th}$ text sample, where $y_0$ represents outcome in absence of treatment and $y_1$ represents outcome when treatment is applied and $x_i$ are the other covariates (features). The average treatment effect is the expected effect of providing the treatment (i.e. including a specific feature) and is given by $E[y_1(x_i) - y_0(x_i)]$. In certain examples, the average treatment effect cannot be directly calculated as the outcome if a certain part of is changed is changed in a certain way, i.e., $y_1(x_i)$ and $y_0(x_i)$ is not known for the same i. Moreover, in observed data, the treatment assignment is not independent of baseline covariates. In certain examples, the cause effect analysis 150 includes employing a propensity-based scoring to balance treatment assignment in treated and untreated groups, where a propensity score is a probability of treatment assignment conditional on baseline covariates, i.e. $\pi(x_i) = p(t_i = 1 | x_i)$. Propensity scores may be approximated by applying multi-layer neural networks. The average treatment effect can be estimated by inverse propensity treatment weighing (IPTW), where each outcome is weighted by inverse probability of receiving the corresponding treatment. Thus, average treatment effect (ATE) can be represented as follows:

$$ATE = \frac{1}{n}\sum_{i=1}^{n}\left[\frac{t_i y_i}{\pi(x_i)} - \frac{(1-t_i)y_i}{1-\pi(x_i)}\right] \quad \text{(Equation 1)}$$

In certain embodiments, for a doubly robust estimate, the cause effect analysis 150 involves augmenting an IPTW with a potential outcome models, which estimate outcomes if treatment is applied (+=1) or not applied (t=0), given other covariates. In an embodiment, the cause effect analysis 150 involves modelling potential outcomes using two neural networks (for t=0,1) trained to minimize mean squared error in predicted and actual outcome in observed articles with t=1 and t=0, respectively. In this embodiment, the expected outcome in presence of the treatment feature is a function of the observed outcome with treatment for the treated group and predicted outcome with treatment for the untreated group, given article features, weighted by a function of the propensity scores, as follows:

$$y_0(x_i) = \frac{(t_i)y_i}{\pi(x_i)} + \frac{t_i - \pi(x_i)}{\pi(x_i)}\hat{y}_1(x_i) \quad \text{(Equation 2)}$$

Similarly, the overall response in the absence of treatment may be estimated as follows:

$$y_0(x_i) = \frac{(1-t_i)y_i}{1-\pi(x_i)} + \frac{t_i - \pi(x_i)}{1-\pi(x_i)}\hat{y}_0(x_i) \quad \text{(Equation 3)}$$

The average effect of the treatment feature on the outcome can be estimated, in certain embodiments, as the mean of a difference of expected outcome with and without treatment, as follows:

$$ATE = \frac{1}{n}\sum_{i=1}^{n}(y_1(x_i) - y_0(x_i)) \quad \text{(Equation 4)}$$

This average treatment effect determination may provide an estimate of which features have the most impact on the outcome metric (the stage identifier). In certain embodiments, an average treatment effect of continuous treatment features could be estimated in a similar fashion, assuming a normal treatment distribution.

At 420, the process 400 involves determining a metric loss function. In certain examples, to incorporate a feedback of a level of control achieved on the target stage during generation of output text, an explicit metric loss function is introduced. The metric loss is defined as a cross entropy loss between an input stage (e.g. a current stage indicated by a current stage identifier) and a predicted stage identifier for the generated output text. In certain examples, the metric loss is calculated using a classifier (e.g. a BERT-based classifier) trained on the stage identifier associated with historical text content across various stages and topics (e.g. in the aggregate content interaction history 141). Such a classifier, which is able to predict the target stage identifier on a held-out test set from historical text content can serve as an indicator, with high confidence, of a predicted stage identifier for generated output text.

In certain examples, a target stage identifier z is summed up with the token embedding and position embedding of the input vector to a first transformer layer, and helps in teaching the model 213 a relationship between input vectors and stage identifier. In certain examples, a final input vector includes token embeddings, position embeddings, a current stage identifier, a topic, and a target stage identifier. In certain examples, a compatibility function in a self-attention layer is modified to bias attention scores with respect to the target stage identifier, forcing the model 213 to capture the target stage while attending to different aspects of input data. For transformers, each input token is weighted with respect to other inputs in an input sentence. For example, for each token $x_t$, the computing system 200 learns weight matrices $W^Q$, $W^K$, and $W^V$ for a query $q_t$, a key $k_t$, and a value $v_t$, respectively. The attention score for token $x_t$ is computed by a compatibility function of the corresponding query $q_t$ with the keys $k_i$ of other tokens and the attention vector is computed as a weighted average of these attention scores with the value vector $v_t$. In matrix form, this could be written as:

$$\text{Softmax}\left(\frac{QK^T}{\sqrt{d_k}}\right)V, \quad \text{(Equation 5)}$$

where $d_k$ is the dimension of the key vector $k_t$. In certain examples, the attention calculation could be modified to introduce the control z by changing the query vector to $q_t=\eta_t(z)$, where $\eta_t$ represents an affine transformation. In certain examples, in order to ensure that the target stage guidance is well-defined all the way up to a generative layer in the model, the scale and bias parameters of the normalization layer may be influenced with the target stage identifier as well, for example, by carrying forward the target stage features through normalization layers. For example, layer normalization in transformer models can be calculated as:

$$\text{LayerNorm}(v) = \gamma \frac{v-\mu}{\sigma} + \beta, \quad \text{(Equation 6)}$$

where $\mu$ and $\sigma$ are a mean and a standard deviation of the elements in v, and where $\gamma$ and $\beta$ are the scale and bias parameters. The target stage identifier z is used to modulate hidden representations of the generative model via normalization layers. The scale and bias parameters in the layer normalization may be replaced as functions of z, namely $\gamma(z)$ and $\beta(z)$. The generative model may be trained with a causal language modelling loss given by:

$$\mathcal{L}_G = \mathbb{E}_{x,z \sim x}\left[-\sum_{t=1}^{n} \log P_G(x_t | x_1 \ldots x_{t-1}, z)\right], \quad \text{(Equation 7)}$$

where $P_G(x_t|x_1 \ldots x_{t-1}, z)$ represents a probability of generator G predicting a next token $x_t$ given all the previous tokens and the control z, and x representing a training corpus. In certain examples, the metric loss is defined as:

$$\mathcal{L}_{metric} = \mathbb{E}_{x,z \sim X, \tilde{x}=G(x,z)}\left[-\sum_{t=1}^{n} \log P_F(z|\tilde{x})\right], \quad \text{(Equation 8)}$$

where $P_F(z|\tilde{x})$ denotes a probability of the classifier model predicting the stage identifier of the generated output text $\tilde{x}$ to be the target stage identifier z. In certain examples, the introduction of a target stage identifier metric as control as an input embedding or in a self-attention mechanism or layer normalization provides guidance for the generative model towards the target stage identifier by shifting a language distribution of the generative model.

At 430, the process 400 involves determining a causal loss function. In an example, To induce causally significant features that causally impact the target stage identifier of the generated content, in some embodiments, a causal loss function is determined in the model 213 to lead the model 213 to adopt these features in generated output text. For example, the causally significant features are determined at block 410. Output tokens or an output embedding generated from the model 213 are input into a support vector machine model that extracts considered causally significant lexical and syntactic features. The model 213 may then be optimized on two additional objectives: (1) to minimize a mean squared error between the lexical and syntactic features of the input text and the generated text and (2) to minimize the cross entropy loss between the predicted stage identifier determined using the features extracted from the output text and the target stage identifier. The causal loss can be determined as:

$$L_{causal} = \mathbb{E}_{x,z \sim X, \tilde{x}=G(x,z)}[(t(x)-t(\tilde{x}))^2 - z \log P_{F'}(z|t(\tilde{x}))] \quad \text{(Equation 9)},$$

where $t(x)$ represents the vector of causally significant features extracted from the text x and where the $P_{F'}$ is the probability of a bidirectional encoder representation from transformers (BERT-based) model predicting the stage identifier as being the target stage identifier, given the causal features $t(\tilde{x})$. In this example, prediction models F and F' are trained separately with input features x and $t(x)$ and used to calculate the losses $L_{metric}$ and $L_{causal}$, respectively.

At 440, the process 400 involves training the neural network 211 using a combined loss function to generate the model 213. In an example, during the training phase, the neural network 121 is trained by minimizing or optimizing the causal loss function and/or the metric loss function. In certain examples, during the training phase, the neural network 121 is trained by minimizing or optimizing a combined loss function that is based on both the causal loss function and the metric loss function. An example combined loss could be determined as follows:

$$L_{combined} = \lambda_G L_G + \lambda_{metric} L_{metric} + \lambda_{causal} L_{causal} \quad \text{(Equation 10)},$$

the combined loss being a weighted sum of the causal language modelling loss, the metric loss, and the causal loss, where $\lambda_G$, $\lambda_{metric}$, and $\lambda_{causal}$ are tunable weight parameters for these loss functions, respectively.

During the training period, the computing system 200 may provide a training information that is used to train the neural network 121. As part of the processing in 440, one or more optimization techniques (e.g., back propagation techniques) may be used to iteratively train the neural network 121 while optimizing one or more of the combined loss functions, the causal modelling loss function, the causal loss function, and the metric loss function. As part of the optimization, weights and biases associated with different layers of the neural network 121 may be changed such that the errors in the prediction of the output text and the predicted stage identifier for the output text is minimized. In some examples, the computing system 200 trains the neural network 121 over the training period by optimizing model 213 parameters to minimize the causal language modelling loss function, the causal loss function, and the metric loss function. In another example, the computing system 200 trains the neural network 121 over the training period by optimizing the model 213 parameters to minimize the combined loss function. In an example, over the training period, the computing system 200 trains the neural network 121 according to hyperparameters information 119 retrieved from the memory storage subsystem 127. The computing system 200 may optimize one or more model 213 parameters relevant to determining the generated output text or determining the predicted stage identifier for the generated output text over the training period in accordance with the hyperparameters information 119 in order to minimize the causal loss function, the metric loss function, or the combined loss function. For example, model 213 parameters of the neural network 211 comprise one or more of weight matrices, bias terms, or other model 213 parameters described in equations 5, 6, 7, 8, 9, and/or 10.

The neural network architecture described herein is example and other or additional appropriate model 213 parameters may be updated depending on the specific architecture of neural network 121 utilized, which may or may not correspond to the example neural network 121 architecture described in FIG. 2. In certain example, the neural network 121 comprises the generative transformer network 500 described in FIG. 5.

FIG. 5 depicts a generative transformer network 500 for implementing certain embodiments disclosed herein. For example, the neural network 171 described in FIG. 1 and the neural network 211 described in FIG. 2 may be implemented with one or more features of the generative transformer network 500 of FIG. 5. The generative transformer network 500 has a GPT-2 architecture and includes at least one self-attention layer 504, at least one fully connected layer 506, and at least one normalization layer (e.g. normalization layers 505 and 507). The generative transformer network 500 is applied to an input vector generated from (A) a token embedding 502 that includes metric tokens (e.g. current stage identifier and target stage identifier), (B) an input embedding 501 that includes one or more keywords, and (C) a positional embedding 503 defining a position of each of the keywords in the input embedding 501. The generative transformer network 500 generates an output embedding 508 based on the input vector. In certain examples, the generative transformer network 500 iteratively (for example, twelve times as depicted in FIG. 5) (1) generates a subsequent input vector based on the output embedding and (2) generates a subsequent output embedding based on the subsequent input vector.

The generative transformer network 500 is trained on a language modeling loss 510 for predicting a next token given all previous tokens. The generative transformer network 500 is first pre-trained with a language modeling objective on a large corpora to build understanding of language distribution, enabling the generative transformer network 500 to generate coherent text. Fine-tuning with the objective shifts the language distribution of generated text toward the fine-tuning corpus. To control for a target metric (e.g. a target stage identifier), the target metric is used to modify self-attention layers 504 and normalization layers 505 and 507 in the transformer blocks, as shown in FIG. 5. In a self-attention layer 504, attention weights of transformer blocks are biased towards the target metric by changing the query vector in the attention mechanism with the affine transformation of the target metric y. In the normalization layers 505 and 507, the scale and bias parameters of layer normalization 505 and 507 are replaced by functions of y (e.g. (e.g. $\gamma_1\beta_1$ and $\gamma_2\beta_2$), which ensures that target information does not wash away and is preserved through the normalization layers. The generative transformer network 500 is trained with a language modelling loss 510 given by $$\mathcal{L}_G = \mathbb{E}_{x,z\sim x}\left[-\sum_{i=1}^{n} \log P_G(x_i \mid x_{<i}, y)\right].$$

The generative transformer network 500 may also be trained with a metric loss 512, which is introduced as a feedback for a degree of metric control achieved during generation. The metric loss 512 is defined as the cross entropy loss between the input target metric (e.g. current stage identifier) and the predicted metric (e.g. predicted stage identifier) for the generated output text. The predicted metric may be calculated using a fastText classifier trained on the outcome of the historical text across various metrics. Such a classifier, which predicts the engagement on a held-out text set with high confidence, serves as an indicator of an expected engagement on generated output text. The metric loss 512 may be given by $L_{metric}=\mathbb{E}_{x,y,\tilde{x}=G(x,y)}[-y \log P_F(y|\tilde{x})]$, where $P_F(y|\tilde{x})$ denotes a probability of the outcome of the generated text x to be the target metric y. In addition to the target metric y as a control in the input embedding 501, the self-attention layer 504 mechanism or layer normalization 505 of the generative transformer network 500 also may guide the generative model towards the target metric by shifting the language distribution of the generative model by adding a causal guidance in the generation process. For example, a causal loss 511 in the generative transformer network 500 can lead the generated output text to adopt causally significant features (t) 509. Output embeddings 508 generated by the generative transformer network 500 are input to a support vector machine that extracts these causally significant features 509 from the generated output text. The generative transformer network 500 is then trained with an additional objective of minimizing the cross-entropy causal loss 511 between the target metric (e.g. the target stage identifier) and the predicted outcome metric (e.g. the predicted stage identifier) for the generated output text based on these causally significant features (t) 509 in the generated output text. The causal loss 511 may be given by $L_{causal}=\mathbb{E}_{x,y,\tilde{x}=G(x,y)}[(-y \log P_{F'}(y|t(\tilde{x}))]$, where $P_{F'}$ is the expected outcome metric given the causally significant features/(x) 509, estimated using a fastText model trained on causal features extracted from the observed data. Introducing the causal loss 511 may ensure that the causally significant features 509 in the generated output text adheres to the target metric (e.g. the target stage identifier), by isolating an effect of the causally significant features 509 in the generated output text from its context. In some examples, a combined weighted sum of the losses may be used, as a combined loss function, to train the generative transformer network 500 and may be given as $L_{combined}=\lambda_G L_G + \lambda_{metric} L_{metric} + \lambda_{causal} L_{causal}$, where $\lambda_G$, $\lambda_{metric}$, and $\lambda_{causal}$ are weights for causal language modelling loss 510, metric loss 512, and causal loss 511 functions, respectively, selected by hyper-parameter tuning on a validation set.

FIG. 6 depicts an example multimodal asset retrieval process 600, according to certain embodiments disclosed herein. The processing depicted in FIG. 6 may be implemented in software (e.g., code, instructions, program) executed by one or more processing units (e.g., processors, cores of content generator system 130 depicted in FIG. 1) of the respective systems, hardware, or combinations thereof. The software may be stored on a non-transitory storage medium (e.g., on a memory device). The process 600 depicted in FIG. 6 and described below is intended to be illustrative and non-limiting. Although FIG. 6 depicts the various processing blocks occurring in a particular sequence or order, this is not intended to be limiting. In certain alternative embodiments, the blocks may be performed in some different order or some blocks may also be performed in parallel. For illustrative purposes, the process 600 is described with reference to certain examples depicted in the figures. Other implementations, however, are possible.

At 610, the process 600 involves retrieving, by the multimodal content generator subsystem 135, generated output text 175. For example, the multimodal content generator subsystem 135 retrieves output text 175 generated via the text generation 170 process of FIG. 1. In some examples, the multimodal content generator subsystem 135 retrieves output text 175 generated by the text generator subsystem 133 via the process 300 of FIG. 3. In some examples, the output text 175 was generated using the neural network 211 of FIG. 2. In some examples, the output text 175 was generated using the generative transformer network of FIG. 5.

At 620, the process 600 involves extracting, for the generated output text 175 and by the multimodal content generator subsystem 135, keywords and topics and the predicted stage identifier for the output text 175 as determined using the neural network 211. For example, the generated output text 175 is represented by word embeddings (or other representation of the output text) for the output text 175, topics and keywords extracted from the output text 175, and a predicted stage identifier for the output text 175. In certain embodiments, the multimodal content generator subsystem 135 uses a Latent Dirichlet Allocation (LDA) based topic model to extract one or more topics from the generated output text 175. The multimodal content generator subsystem 135 may extract keywords from the output text 175 based on a pre-defined vocabulary stored in the data storage unit 137. The pre-defined vocabulary list may be automatically generated using frequently occurring or salient words. The words in the output text 175 that correspond to words in the pre-defined vocabulary list are determined to be keywords. For example, the multimodal content generator subsystem 135 detects one or more keywords in the output text 175 by searching, within the output text 175, for keywords listed in the pre-defined vocabulary, and extracts the detected one or more keywords.

At a time prior to, at a time after, or simultaneously with performance of steps 610 and 620, the process 600 involves performing steps 630 and 640. At step 630, the process 600 involves accessing, by the multimodal content generator subsystem 135 a content repository. In certain examples, the content repository is accessible via the data storage unit 137.

At 640, the process 600 involves extracting, by the multimodal content generator subsystem 135, keywords and topics and determining a content-stage probability for each of the content in the content repository. For example, each content in the content repository is represented by word embeddings (or other representation of output text), topics, and keywords extracted from the respective content, and a predicted stage identifier. For example, the content in the content repository could include output text 175 generated using the neural network 211 as well as multimodal content associated with the output text 175. In this example, each content in the content repository is associated with a predicted stage identifier predicted by the neural network 211 for the output text 175 associated with the content. Further, in this example, each content in the content repository is associated with an output embedding generated via the neural network 211 that comprises the output text 175, one or more keywords, and one or more topics. In this example, the multimodal content generator subsystem 135 uses an LDA based topic model to extract one or more topics from each content in the content repository. In this example multimodal content generator subsystem 135 may extract keywords from each content based on a pre-defined vocabulary stored in the data storage unit 137. For example, multimodal content generator subsystem 135 may extract keywords from the output text 175 in each content based on a pre-defined vocabulary stored in the data storage unit 137. For example, the multimodal content generator subsystem 135 detects, for each content in the content repository, one or more keywords in the output text 175 by searching, within the output text 175, for keywords listed in the pre-defined vocabulary, and extracts the detected one or more keywords.

In response to completing steps 620 and 640, the process 600 proceeds to step 650. At step 650, the process 600 involves determining, by the multimodal content generator subsystem 135, a similarity, for each content in the content repository, between (A) the predicted stage identifier, one or more keywords, and one or more topics determined for the generated output text 175 and (B) a predicted stage identifier, one or more keywords, and one or more topics determined for the respective content in the content repository. In certain embodiments, the multimodal content generator subsystem, similarity values including (a) a similarity between the predicted stage identifier determined for the generated output text 175 and a predicted stage identifier determined for the respective content in the content repository, (b) a similarity between the one or more keywords determined for the generated output text 175 and one or more keywords determined for the respective content in the content repository, and (c) a similarity between the one or more topics determined for the generated output text 175 and one or more topics determined for the respective content in the content repository. In certain embodiments, the multimodal content generator may determine a combined similarity value based on the similarity values (a), (b), and (c). In certain examples, the multimodal content generator subsystem 135 uses a cosine similarity algorithm to determine a similarity value for each content in the content repository based on a similarity of each content to the generated output text 175. In certain examples, the multimodal content generator subsystem 135 ranks the content in the content repository based on the determined similarity value for each content in the content repository.

At block 660, the process involves determining, by the multimodal content generator subsystem 135, a best matched multimodal asset from the content repository based on the determined similarity values. For example, the multimodal content generator subsystem 135 selects, from the ranked list of content in the content repository, one or more multimodal content 183 having a greatest similarity value determined according to block 650. In certain examples, the process 600 further involves inserting, by the multimodal content generator subsystem 135 and into a template, the retrieved best matched multimodal content 183.

In certain examples, the multimodal content generator subsystem 135 transmits the template to the target user computing device 101 for display via the target user computing device 101. The target user computing device 101 receives the template including the inserted output text 175 and inserted multimodal content 183 and displays, via the user interface 102, the template. In certain examples, the target entity associated with the target user computing device 101 views the template or otherwise interacts with the template via the target user computing device 101. In certain examples, the content generator system 130 receives a request or other communication (e.g. selection of a link) from the target user computing device 101 that indicates that the target entity transitioned to a stage of the multi-stage objective other than the stage associated with the current stage identifier (e.g. the target entity transitioned to the target stage associated with the target stage identifier). In certain examples, the content generator system 130 logs, in response to receiving the request or other communication from the target user computing device, logs a current stage identifier for the target entity. In certain examples, the content generator computing device 110 receives, from the target user computing device 101, one or more communications indicating that the target entity viewed the template and indicating that the target entity transitioned to a subsequent stage other than the current stage. In these examples, in response to receiving an input from the operator of the content generator computing device 110, the content generator computing device 110 transmits, to the content generator system 130, a request to log the subsequent stage identifier for the target entity. In these examples, the content generator system 130 receives the request and logs the subsequent stage identifier for the target entity.

Examples of Computing Environments for Implementing Certain Embodiments

Figure 7:
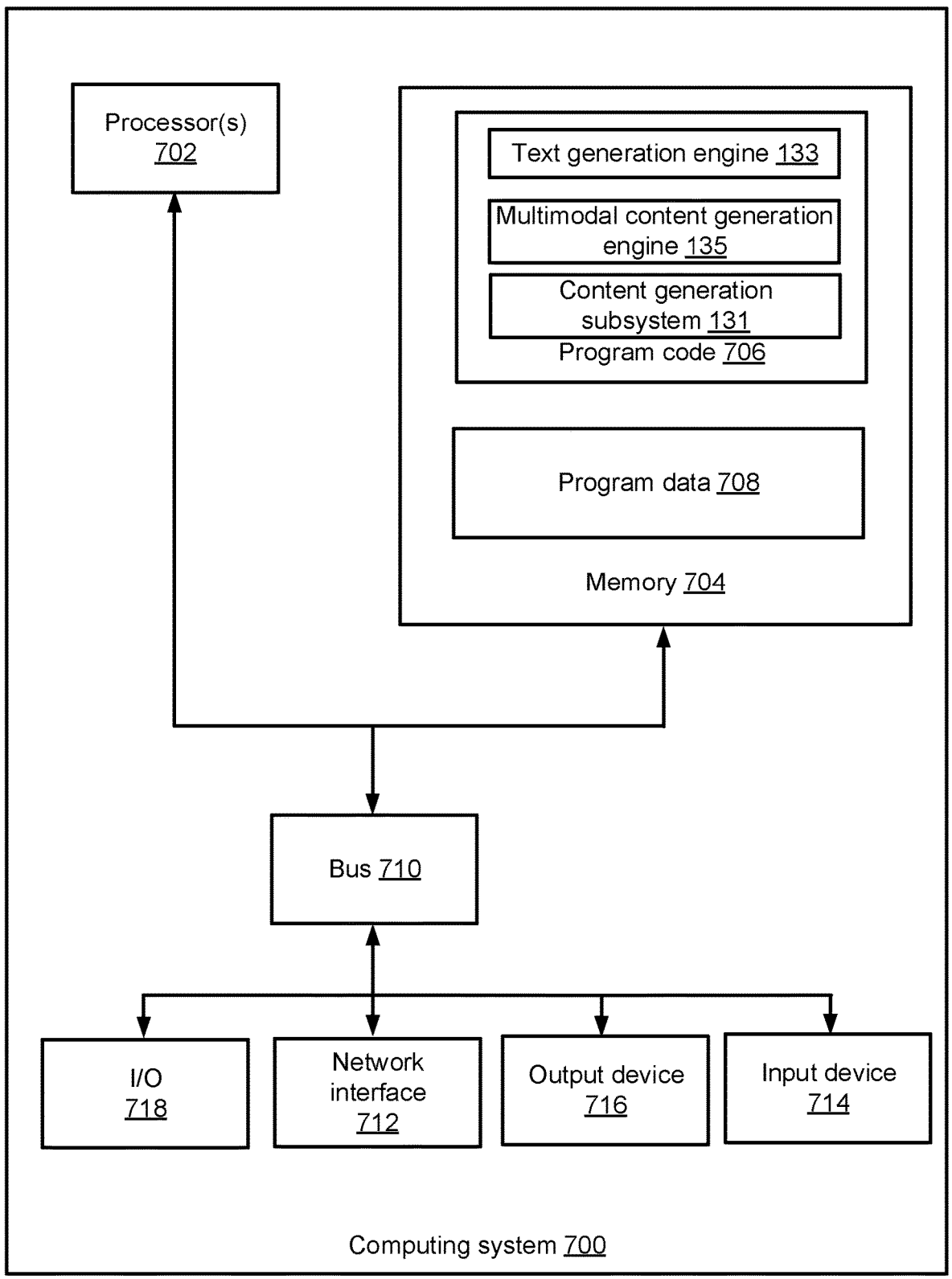
FIG. 7 depicts an example of a computing system that performs certain operations described herein, according to certain embodiments described in the present disclosure.

Any suitable computer system or group of computer systems can be used for performing the operations described herein. For example, FIG. 7 depicts an example of a computer system 700. The depicted example of the computer system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 706, program data 708, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 404 can be volatile memory, non-volatile memory, or a combination thereof.

The computer system 700 executes program code 706 that configures the processor 702 to perform one or more of the operations described herein. Examples of the program code 706 include, in various embodiments, neural network 121 of FIG. 2, which may include any other suitable systems or subsystems that perform one or more operations described herein (e.g., one or more neural networks, encoders, attention propagation subsystem and segmentation subsystem). The program code 706 may be resident in the memory device 704 or any suitable computer-readable medium and may be executed by the processor 702 or any other suitable processor.

The processor 702 is an integrated circuit device that can execute the program code 706. The program code 706 can be for executing an operating system, an application system or subsystem, or both. When executed by the processor 702, the instructions cause the processor 702 to perform operations of the program code 706. When being executed by the processor 702, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 704 store the program data 708 that includes one or more datasets described herein. In some embodiments, one or more of data sets are stored in the same memory device (e.g., one of the memory devices 704). In additional or alternative embodiments, one or more of the programs, data sets, models, and functions described herein are stored in different memory devices 704 accessible via a data network. One or more buses 710 are also included in the computer system 700. The buses 710 communicatively couple one or more components of a respective one of the computer system 700.

In some embodiments, the computer system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices via a data network using the network interface device 712.

The computer system 700 may also include a number of external or internal devices, an input device 714, a presentation device 716, or other input or output devices. For example, the computer system 700 is shown with one or more input/output ("I/O") interfaces 718. An I/O interface 418 can receive input from input devices or provide output to output devices. An input device 714 can include any device or group of devices suitable for receiving visual, auditory, or other suitable input that controls or affects the operations of the processor 702. Non-limiting examples of the input device 714 include a touchscreen, a mouse, a keyboard, a microphone, a separate mobile computing device, etc. A presentation device 716 can include any device or group of devices suitable for providing visual, auditory, or other suitable sensory output. Non-limiting examples of the presentation device 716 include a touchscreen, a monitor, a speaker, a separate mobile computing device, etc.

Although FIG. 7 depicts the input device 714 and the presentation device 716 as being local to the computer system 700, other implementations are possible. For instance, in some embodiments, one or more of the input device 714 and the presentation device 716 can include a remote client-computing device that communicates with computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 8:
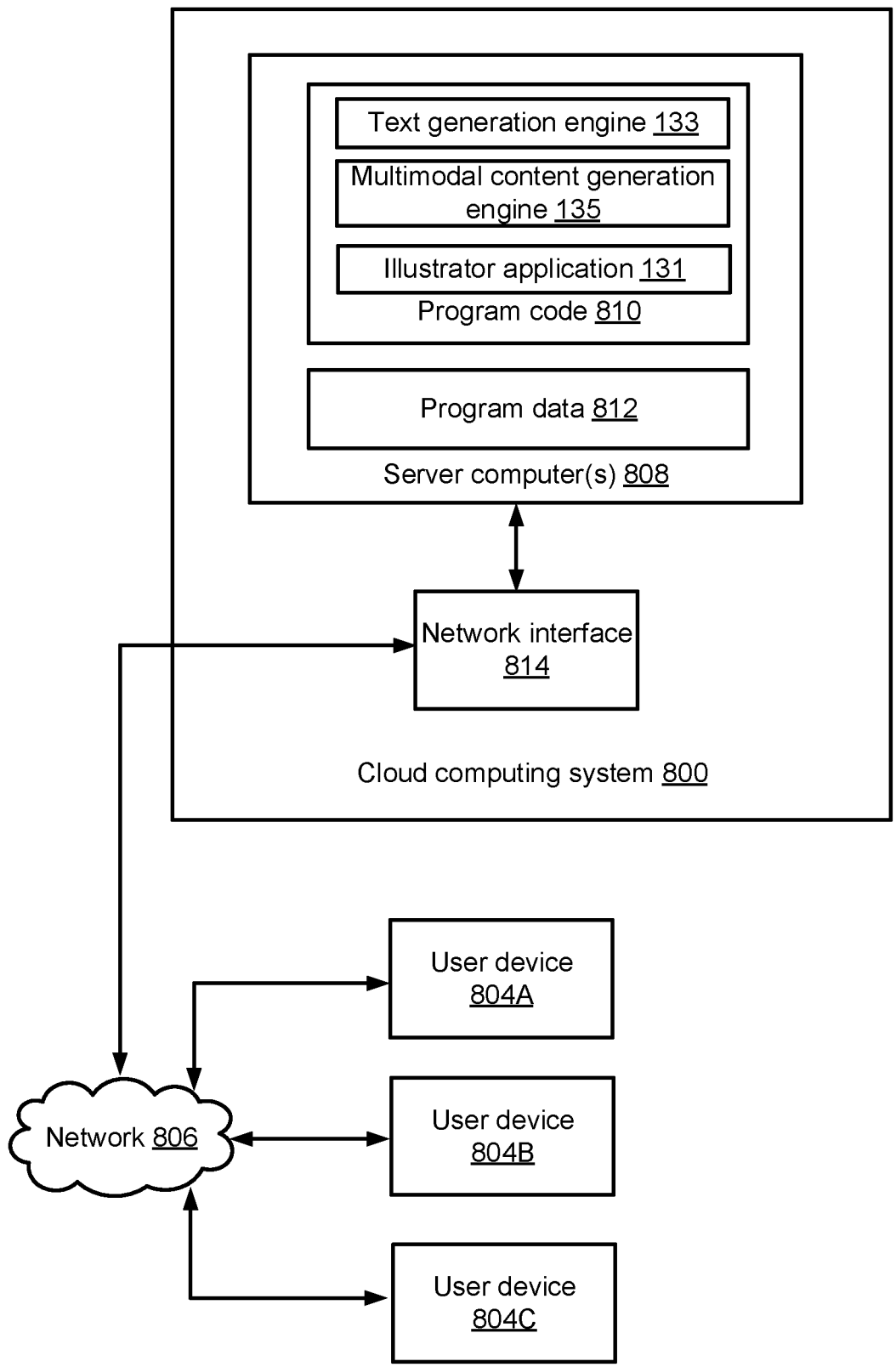
FIG. 8 depicts an example of a cloud computing system that performs certain operations described herein, according to certain embodiments described in the present disclosure.

In some embodiments, the functionality provided by computer system 700 may be offered as cloud services by a cloud service provider. For example, FIG. 8 depicts an example of a cloud computer system 800 offering a service for (a) generating output text and (b) predicting a stage identifier for the output text that can be used by a number of user subscribers using user devices 804A, 804B, and 804C across a data network 806. In the example, the service for (a) generating output text and (b) predicting a stage identifier for the output text may be offered under a Software as a Service (SaaS) model. One or more users may subscribe to the next event prediction and dynamic clustering service, and the cloud computer system 800 performs the processing to provide the service for (a) generating output text and (b) predicting a stage identifier for the output text to subscribers. The cloud computer system 800 may include one or more remote server computers 808.

The remote server computers 808 include any suitable non-transitory computer-readable medium for storing program code 810 (e.g., neural network 211) and program data 812, or both, which is used by the cloud computer system 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 508 can include volatile memory, non-volatile memory, or a combination thereof.

One or more of the server computers 808 execute the program code 810 that configures one or more processors of the server computers 808 to perform one or more of the operations that provide video frame segmenting services, including the ability to perform both fast and accurate video semantic segmentation using a set of temporally distributed neural networks. As depicted in the embodiment in FIG. 8, the one or more servers providing the services to generate next event prediction and dynamic clustering may implement neural network 211. Any other suitable systems or subsystems that perform one or more operations described herein (e.g., one or more development systems for configuring an interactive user interface) can also be implemented by the cloud computer system 800.

In certain embodiments, the cloud computer system 800 may implement the services by executing program code and/or using program data 812, which may be resident in a memory device of the server computers 808 or any suitable computer-readable medium and may be executed by the processors of the server computers 808 or any other suitable processor.

In some embodiments, the program data 812 includes one or more datasets and models described herein. Examples of these datasets include segmented video frames. In some embodiments, one or more of data sets, models, and functions are stored in the same memory device. In additional or alternative embodiments, one or more of the programs, data sets, models, and functions described herein are stored in different memory devices accessible via the data network 806.

The cloud computer system 800 also includes a network interface device 814 that enable communications to and from cloud computer system 800. In certain embodiments, the network interface device 814 includes any device or group of devices suitable for establishing a wired or wireless data connection to the data networks 806. Non-limiting examples of the network interface device 814 include an Ethernet network adapter, a modem, and/or the like. The next event prediction and dynamic clustering service is able to communicate with the user devices 804A, 804B, and 804C via the data network 806 using the network interface device 814.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method for using generative transformer networks to generate output content, wherein the method includes performing, with one or more processing devices, operations comprising:
    receiving a request to generate content for a target entity, wherein the request includes one or more keywords;
    retrieving, for the target entity, a current stage identifier linking the target entity to a current stage within a multi-stage objective;
    generating an input vector including the current stage identifier, a target stage identifier, a token embedding comprising the one or more keywords, and a position embedding for each of the one or more keywords, the target stage identifier associated with a target stage within the multi-stage objective different from the current stage;
    determining causally significant features of output text using a support vector machine model trained to determine the causally significant features using an average treatment effect approach;
    generating output text content for the target entity by applying a generative transformer network to the input vector, wherein the generative transformer network is trained to determine the output text predicted to cause a transition of the target entity from the current stage to the target stage; and
    transmitting the output text content to a computing device associated with the target entity.

2. The computer-implemented method of claim 1, the operations further comprising:
    prior to generating the input vector, training the generative transformer network using a plurality of loss functions, the plurality of loss functions including at least one causal loss function directed to generating the output text, the causal loss function determining a loss between the target stage identifier and a stage identifier predicted based on causally significant features of the output text.

3. The computer-implemented method of claim 1, wherein applying the generative transformer network to the input vector further generates a predicted stage identifier for the output text, and further comprising:
    training the generative transformer network using a plurality of loss functions including at least a metric loss function directed to predicting the predicted stage identifier for the output text, the metric loss function determining a cross entropy loss between the current stage identifier and the predicted stage identifier for the generated output text.

4. The computer-implemented method of claim 1, wherein the generative transformer network comprises:
    at least one self-attention layer including a compatibility function that biases attention scores with respect to the target stage identifier; and
    at least one normalization layer including scale and bias parameters that are influenced by the target stage identifier.

5. The computer-implemented method of claim 1, wherein the target stage is successive to the current stage in the multi-stage objective.

6. The computer-implemented method of claim 1, wherein applying the generative transformer network to the input vector further generates a predicted stage identifier for the output text, the operations further comprising:

retrieving, from a content repository, a multimodal content to associate with the output text based on the predicted stage identifier for the output text; and transmitting the multimodal content to the computing device associated with the target entity.

7. The computer-implemented method of claim 6, wherein the request to generate content for the target entity further comprises a template including a text section and a multimodal content section, the operations further comprising:

inserting the output text into the text section of the template;

inserting the multimodal content into the multimodal content section of the template, wherein transmitting the output text to the computing device and transmitting the multimodal content to the computing device comprises transmitting the template including the inserted output text and inserted multimodal content to the computing device.

8. The computer-implemented method of claim 6, wherein retrieving, from the content repository, the multimodal content comprises:

extract, for each of multiple multimodal content in the content repository, one or more keywords and a stage identifier associated with a respective text associated with the respective multimodal content;

determining, for each multimodal content in the content repository, a similarity value based on (A) a similarity between (i) the one or more keywords associated with the respective text and (ii) the one or more keywords in the input vector and (B) a similarity between (i) the stage identifier associated with the respective text and (ii) the predicted stage identifier for the output text, wherein the retrieved multimodal content comprises a particular multimodal content from among the multiple multimodal content in the content repository having a greatest determined similarity value.

9. The computer-implemented method of claim 1, wherein the generative transformer network comprises one of a GPT-2 network, a GPT-3 network, a GPT-1 network, or other GPT architecture.

10. A system comprising:

processing hardware; and a non-transitory computer-readable medium communicatively coupled to the processing hardware and implementing a generative transformer network trained using a causal loss function directed to generating output text, the generative transformer network comprising:

a self-attention layer including a compatibility function that biases attention scores with respect to a target stage in a multi-stage objective;

a normalization layer including scale and bias parameters that are influenced by the target stage;

an input layer configured to receive, for a target entity, input data comprising a current stage identifier linking the target entity to a current stage of the multi-stage objective, a target stage identifier associated with the target stage of the multi-stage objective, one or more input keywords, and a positional embedding for each of the one or more input keywords;

an input embedding layer configured to generate an input vector from the input data; and an output layer configured to generate output text content predicted to transition the target entity within the multi-stage objective from the current stage to the target stage;

wherein the causal loss function determines a loss between the target stage identifier and a stage identifier predicted based on causally significant features of the output text.

11. The system of claim 10, wherein the target stage is successive to the current stage in the multi-stage objective.

12. The system of claim 10, wherein the output layer is further configured to generate a predicted stage identifier for the output text, wherein the generative transformer network is trained using a plurality of loss functions, the plurality of loss functions including at least one causal loss function directed to generating the output text, the causal loss function determining a loss between the target stage identifier and the predicted stage identifier for the output text based on causally significant features of the output text.

13. The system of claim 10, wherein the generative transformer network comprises a GPT-2 network.

14. A non-transitory computer-readable medium having program code that is stored thereon, the program code executable by one or more processing devices for performing operations comprising:

receiving a request to generate content for a target entity, wherein the request includes one or more keywords;

retrieving, for the target entity, a current stage identifier linking the target entity to a current stage within a multi-stage objective;

generating an input vector including the current stage identifier, a target stage identifier, a token embedding comprising the one or more keywords, and a position embedding for each of the one or more keywords, the target stage identifier associated with a target stage within the multi-stage objective different from the current stage;

determining causally significant features of output text using a support vector machine model trained to determine the causally significant features using an average treatment effect approach; and generating output text content for the target entity by applying a generative transformer network to the input vector, wherein the generative transformer network is trained to determine the output text predicted to cause a transition of the target entity from the current stage to the target stage.

15. The non-transitory computer readable medium of claim 14, the operations further comprising:

prior to generating the input vector, training the generative transformer network using a plurality of loss functions, the plurality of loss functions including at least one causal loss function directed to generating the output text, the causal loss function determining a loss between the target stage identifier and a stage identifier predicted based on causally significant features of the output text.

16. The non-transitory computer readable medium of claim 14, wherein applying the generative transformer network to the input vector further generates a predicted stage identifier for the output text, the operations further comprising:

prior to generating the input vector, training the generative transformer network using a plurality of loss functions, the plurality of loss functions including at least a metric loss function directed to predicting the predicted stage identifier for the output text, the metric loss function determining a cross entropy loss between the current stage identifier and the predicted stage identifier for the generated output text.

17. The non-transitory computer readable medium of claim 14, wherein applying the generative transformer network to the input vector further generates a predicted stage identifier for the output text, the operations further comprising:
- extracting, for each of multiple multimodal content in a content repository, one or more keywords and a stage identifier associated with a respective text associated with the respective multimodal content;
- determining, for each multimodal content in the content repository, a similarity value based on (A) a similarity between (i) the one or more keywords associated with the respective text and (ii) the one or more keywords in the input vector and (B) a similarity between (i) the stage identifier associated with the respective text and (ii) the predicted stage identifier for the output text;
- retrieving a particular multimodal content from among the multiple multimodal content in the content repository having a greatest determined similarity value; and
- prior to transmitting the output text to the computing device, associating the retrieved multimodal content with the output text, wherein the output text transmitted to the computing device includes the associated multimodal content.

* * * * *